US006822806B2

(12) United States Patent
Suzuki et al.

(10) Patent No.: US 6,822,806 B2
(45) Date of Patent: Nov. 23, 2004

(54) IMAGING OPTICAL SYSTEM AND OPTICAL APPARATUS USING THE SAME

(75) Inventors: Yoshimasa Suzuki, Kawasaki (JP); Tetsuhide Takeyama, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/786,134

(22) Filed: Feb. 26, 2004

(65) Prior Publication Data

US 2004/0174612 A1 Sep. 9, 2004

(30) Foreign Application Priority Data

Mar. 4, 2003 (JP) ....................................... 2003-056596

(51) Int. Cl.$^7$ .............................................. G02B 15/14
(52) U.S. Cl. ........................ 359/686; 359/679; 359/740; 359/779
(58) Field of Search ................................ 359/679, 686, 359/740, 779

(56) References Cited

U.S. PATENT DOCUMENTS

| 5,414,561 | A | | 5/1995 | Wakimoto et al. | .......... 359/663 |
| 5,825,546 | A | * | 10/1998 | Matsui | ........................ 359/557 |
| 6,614,539 | B1 | | 9/2003 | Shimizu | ..................... 356/609 |
| 2004/0105020 | A1 | * | 6/2004 | Iwasawa | ................... 348/240.3 |

OTHER PUBLICATIONS

T. Hayashi and Z. Wakimoto, *Design of Both Side Telecentric Zoom Lens*, Lecture No. 7, Lecture draft collection of Optics Symposium, 17$^{TH}$, 1992.

* cited by examiner

Primary Examiner—Evelyn A. Lester
(74) Attorney, Agent, or Firm—Kenyon & Kenyon

(57) ABSTRACT

An imaging optical system has a variable magnification optical system. The variable magnification optical system includes, in order from the object side, a first lens unit with positive refractive power, a second lens unit with positive refractive power, a third lens unit with negative refractive power, a fourth lens unit with positive refractive power, and an aperture stop interposed between the third lens unit and the fourth lens unit. The variable magnification optical system changes an imaging magnification while keeping an object-to-image distance constant. The imaging magnification is changed by varying spacing between the first lens unit and the second lens unit, spacing between the second lens unit and the third lens unit, and spacing between the third lens unit and the fourth lens unit. When the imaging magnification is changed, the imaging optical system satisfies the following conditions in at least one variable magnification state:

$|En|/L > 0.4$ $|Ex|/|L/\beta| > 0.4$ where En is a distance from a first lens surface on the object side of the variable magnification optical system to the entrance pupil of the imaging optical system, L is the object-to-image distance of the imaging optical system, Ex is a distance from the most image-side lens surface of the variable magnification optical system to the exit pupil of the imaging optical system, and β is the magnification of the entire system of the imaging optical system.

8 Claims, 20 Drawing Sheets

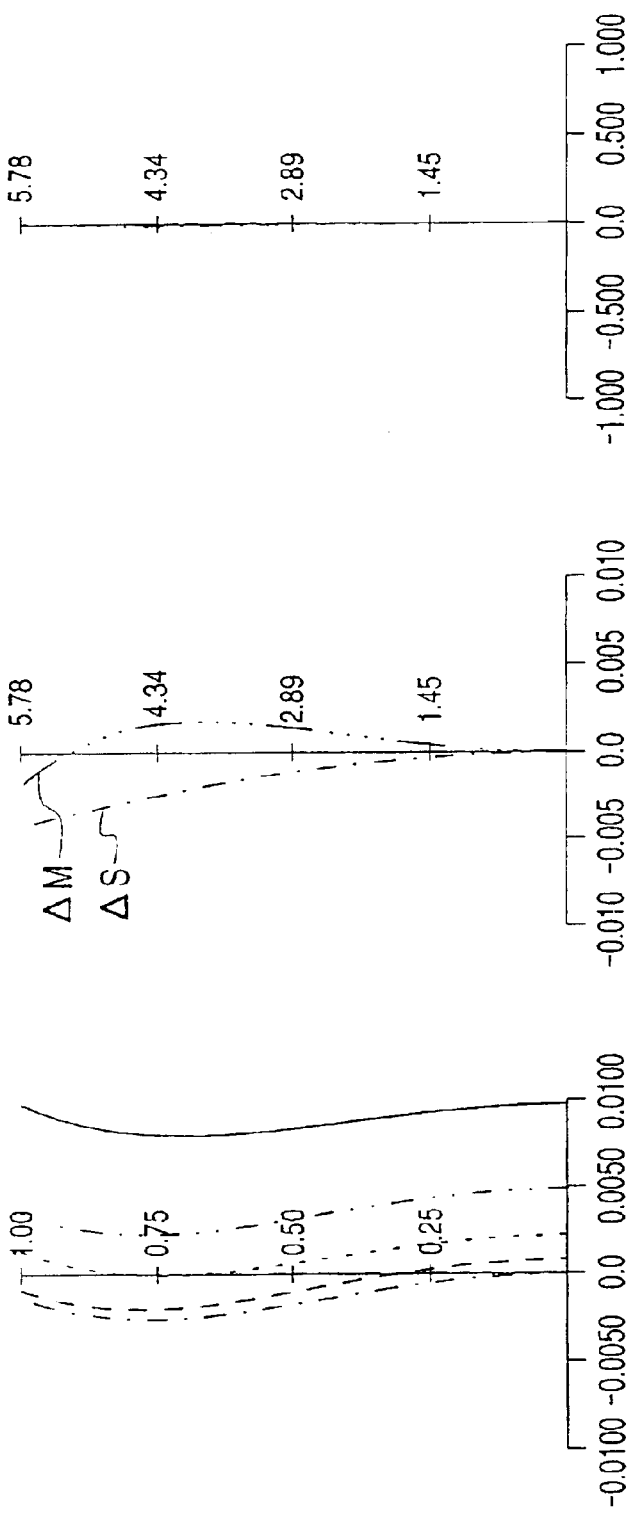

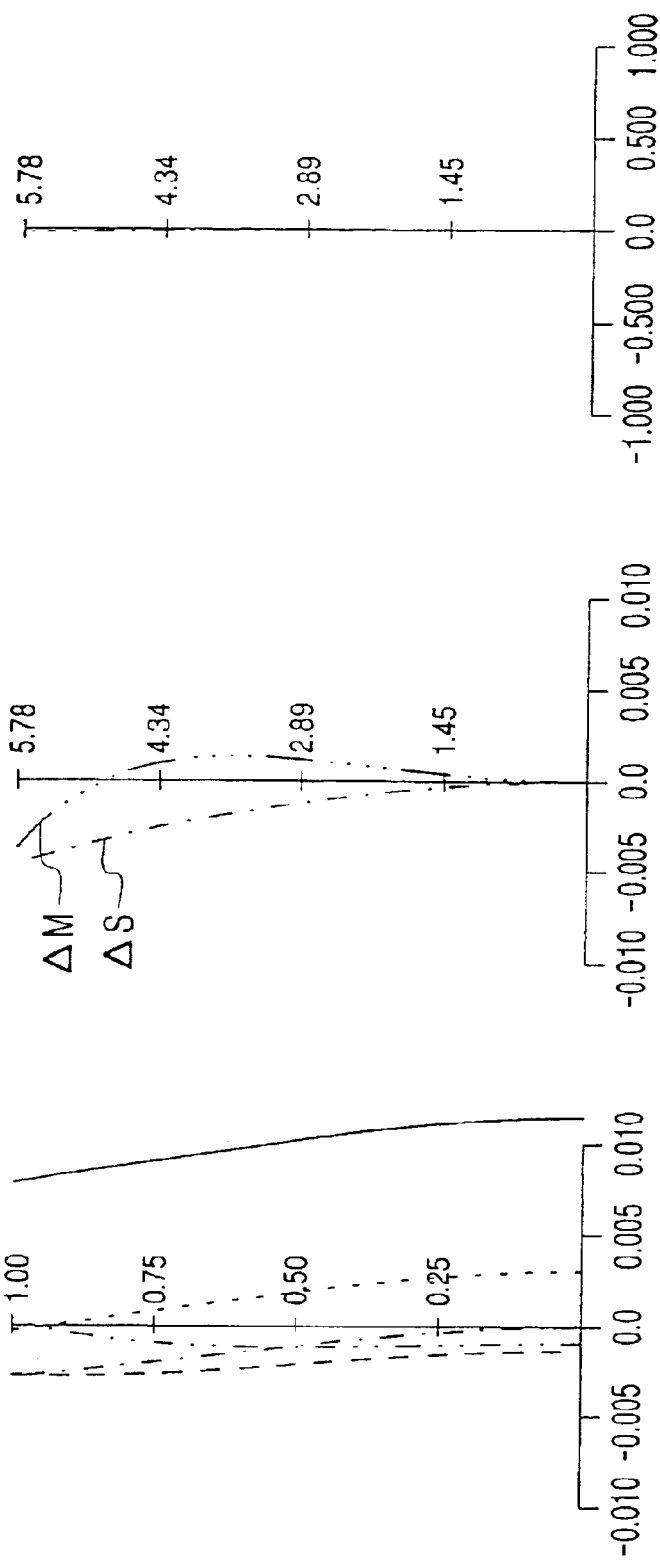
Fig. 4A SPHERICAL ABERRATION
Fig. 4B ASTIGMATISM
Fig. 4C DISTORTION

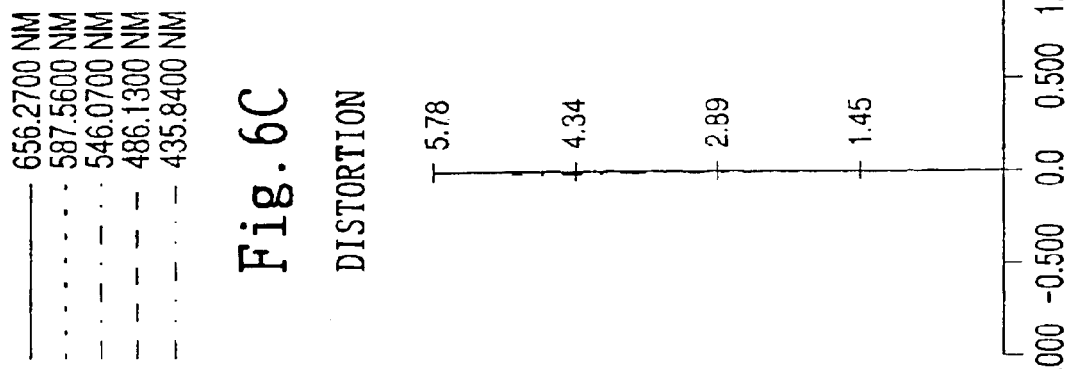
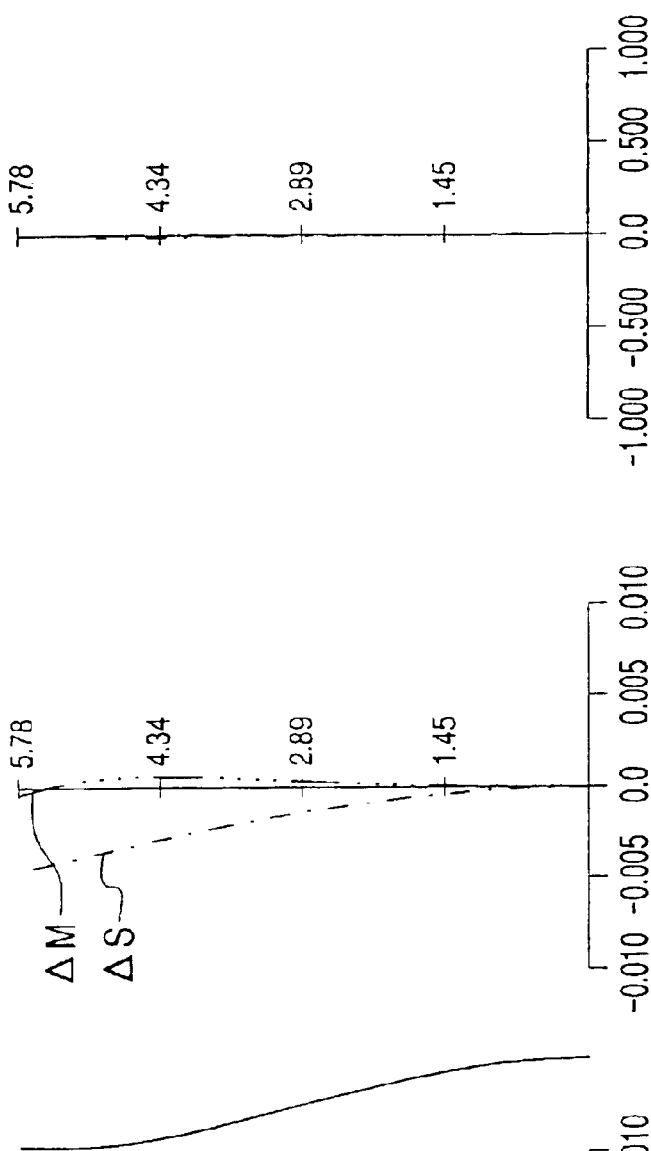
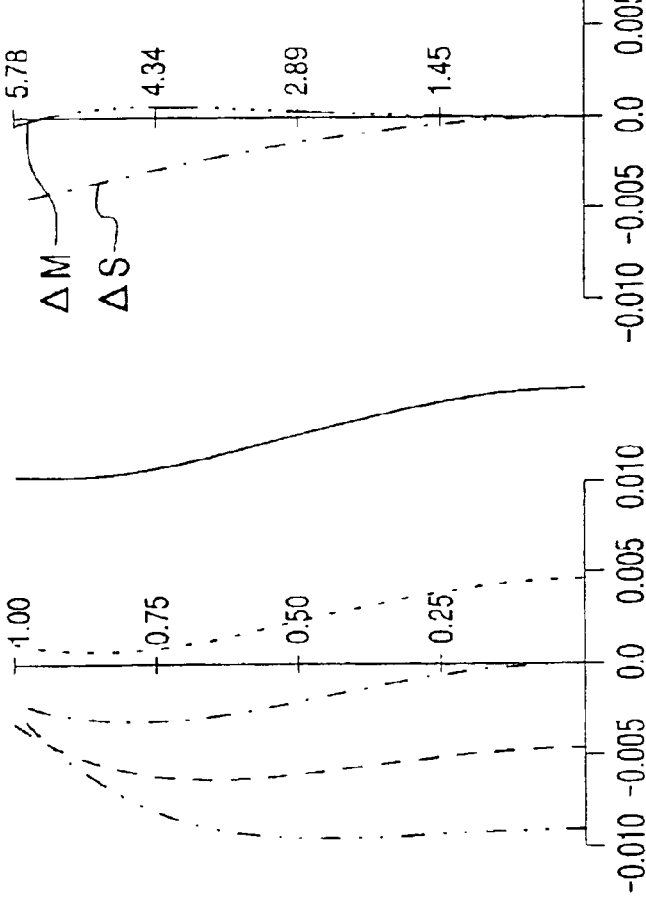

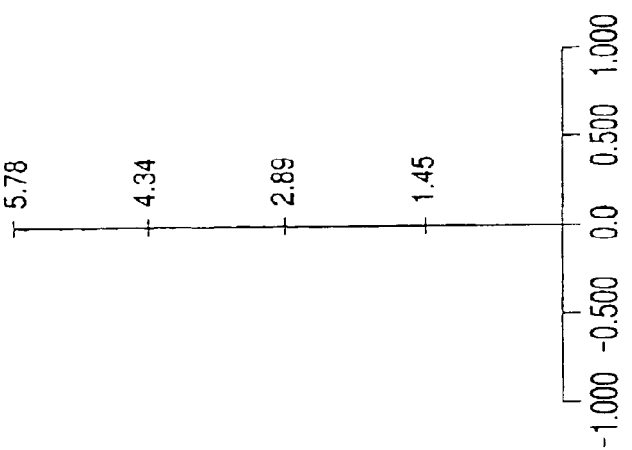
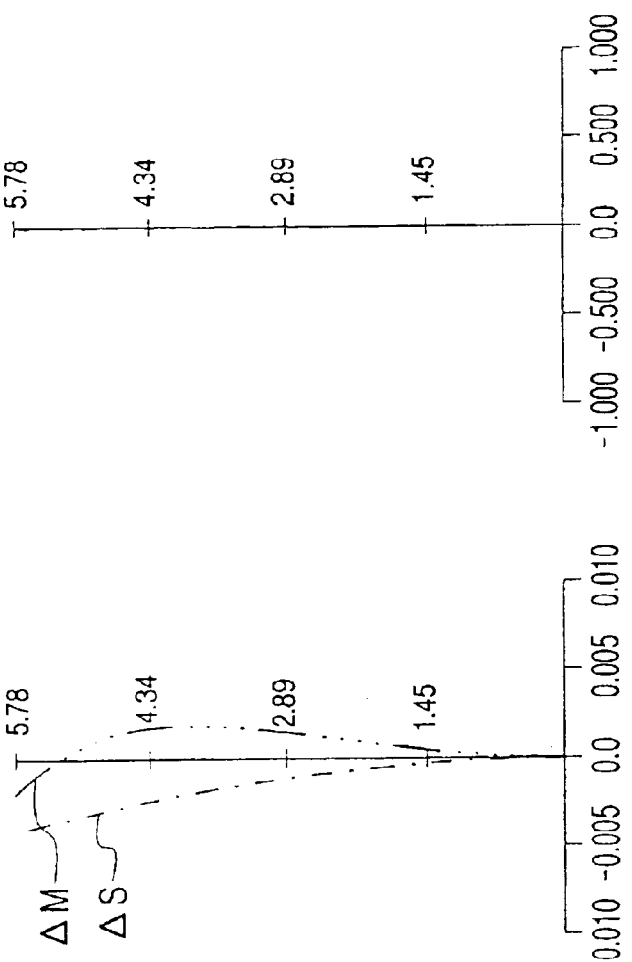
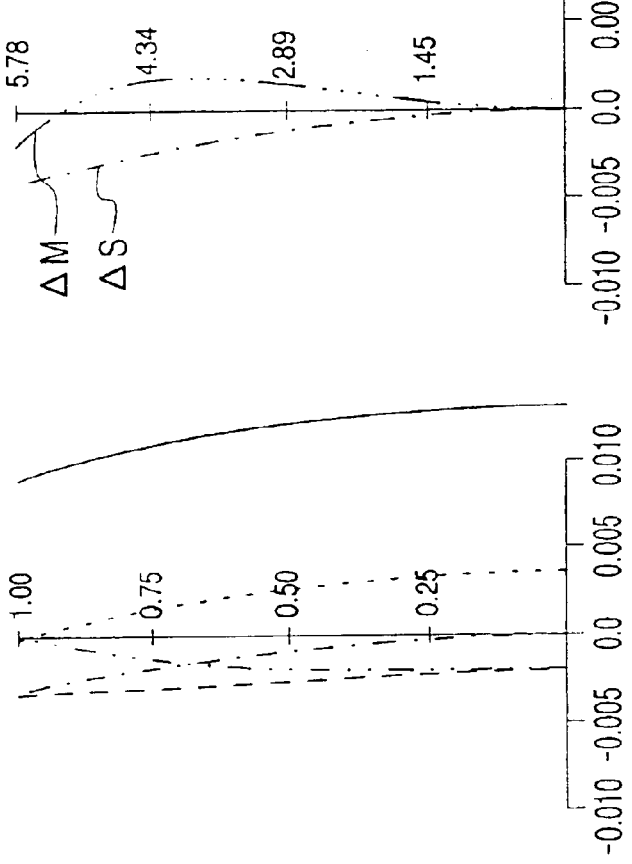
Fig. 8A SPHERICAL ABERRATION
Fig. 8B ASTIGMATISM
Fig. 8C DISTORTION

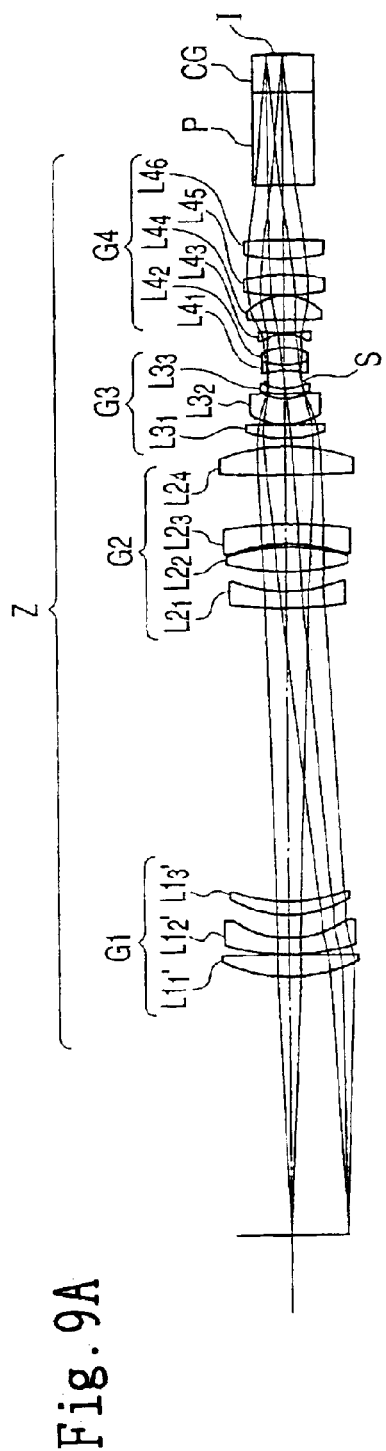
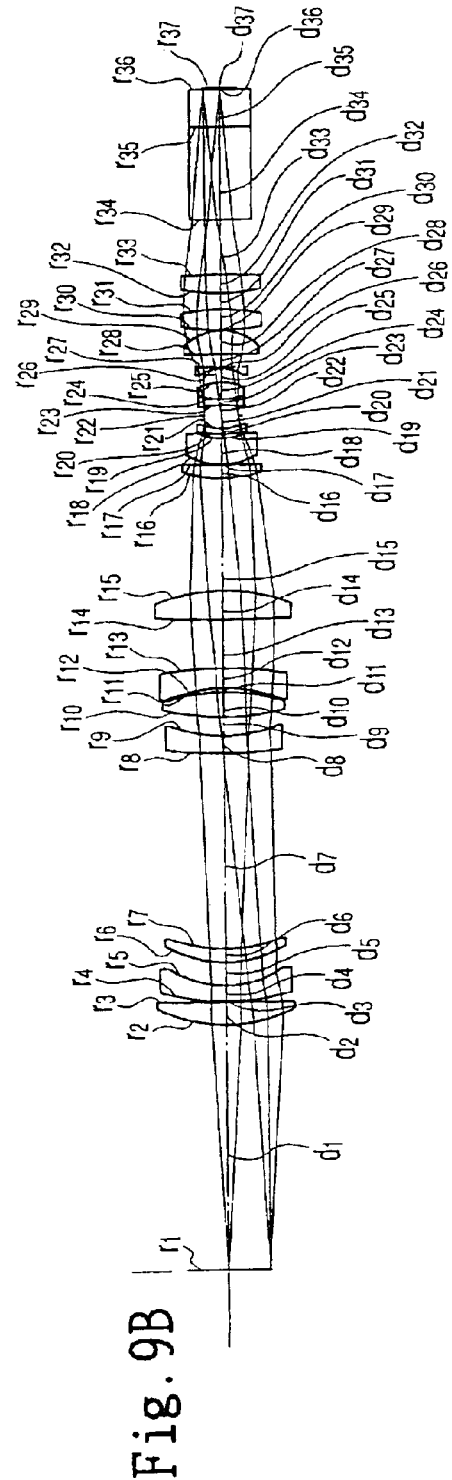
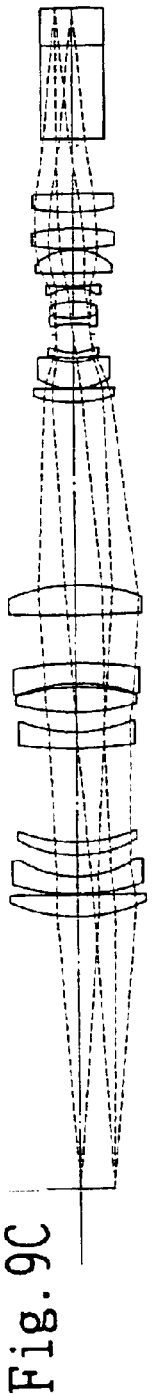
Fig. 9A
Fig. 9B
Fig. 9C

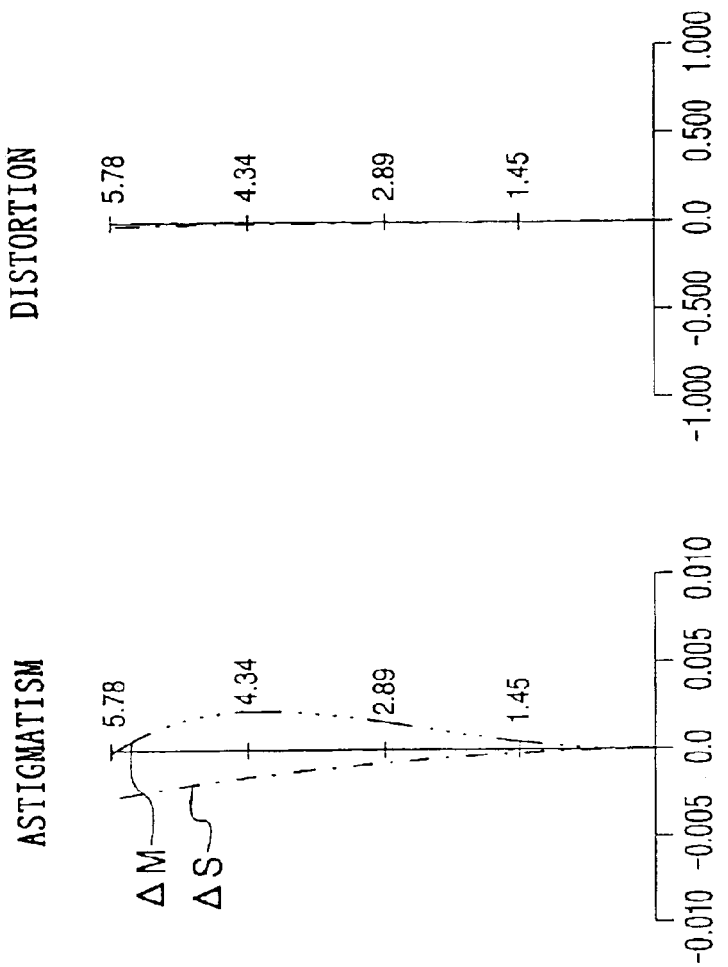
Fig.10A SPHERICAL ABERRATION
Fig.10B ASTIGMATISM
Fig.10C DISTORTION

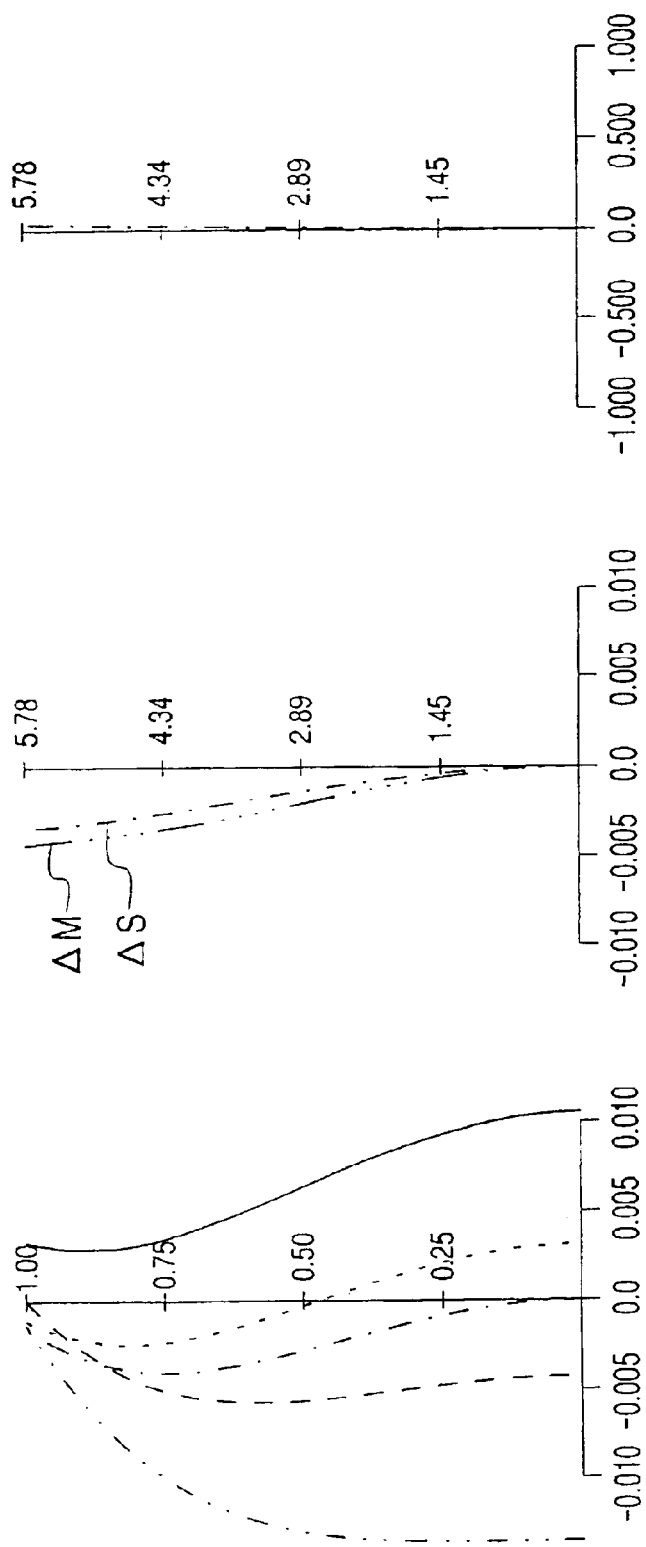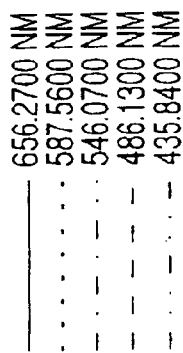

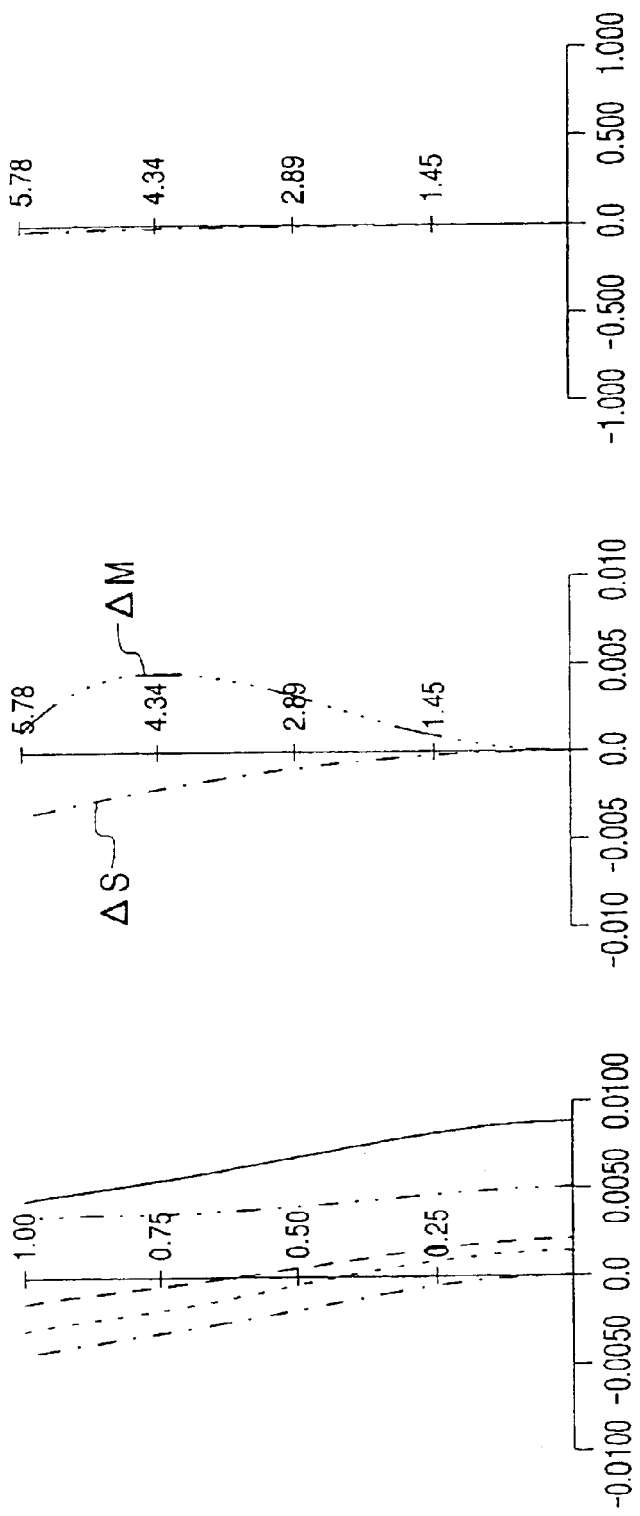

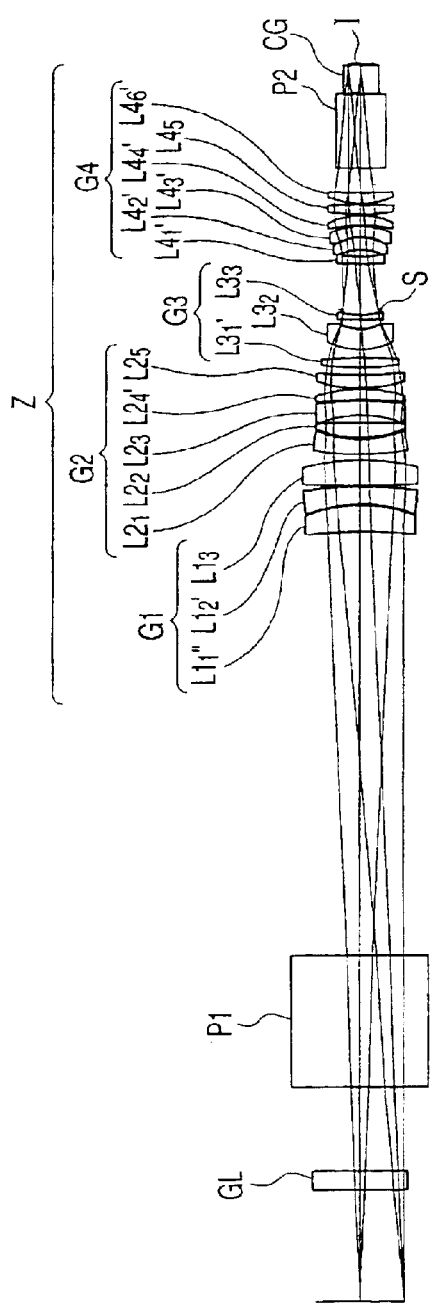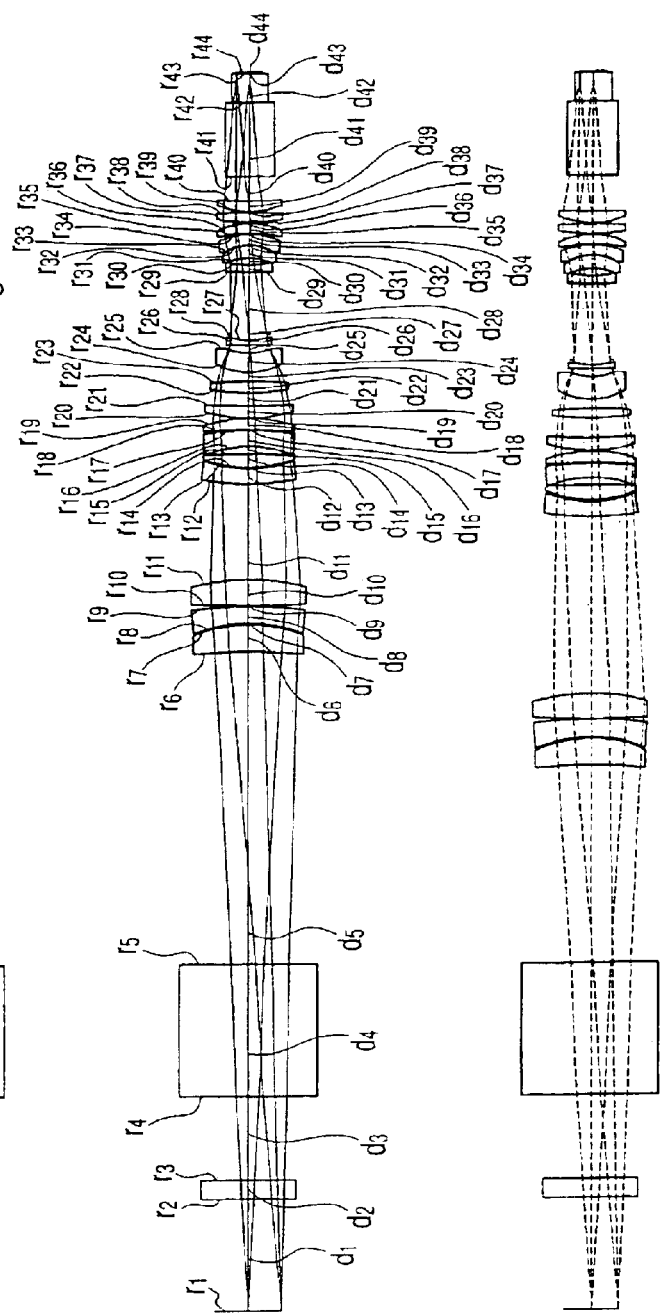
Fig. 15A
Fig. 15B
Fig. 15C

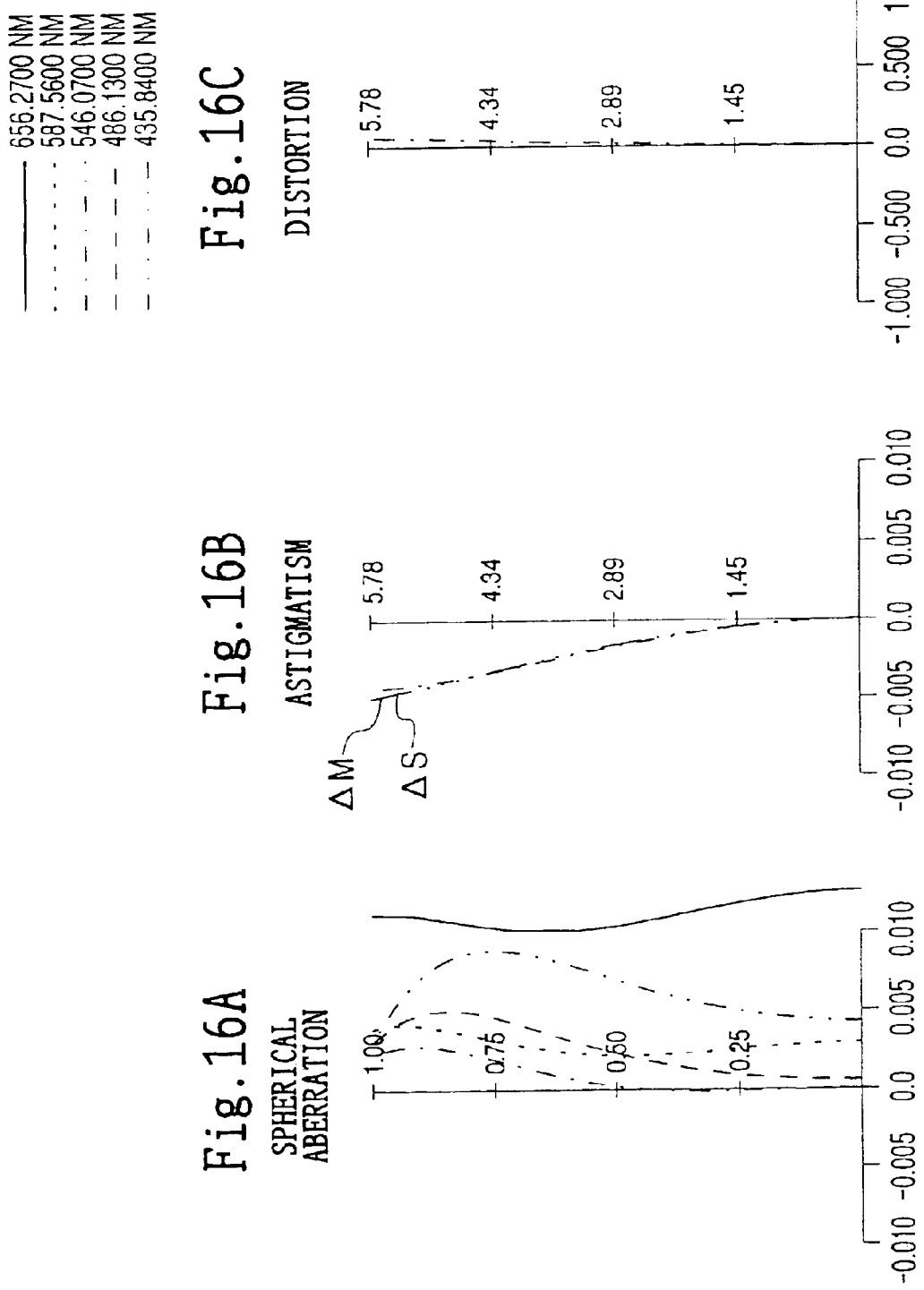

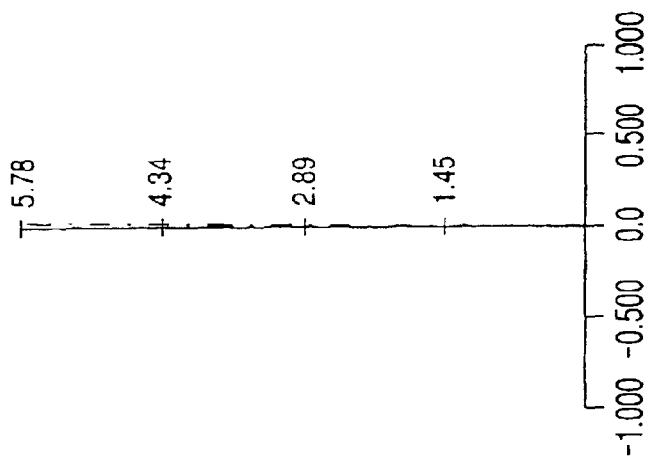
Fig.18C DISTORTION
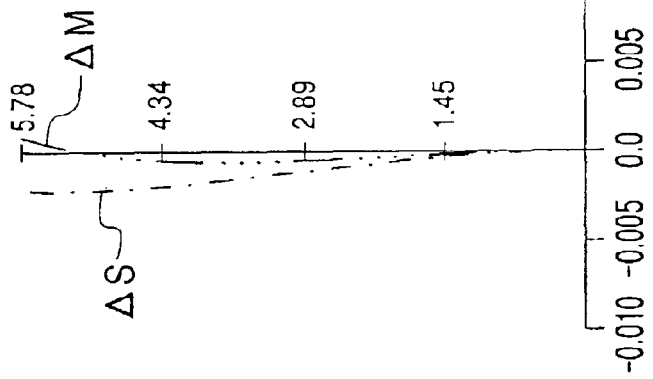
Fig.18B ASTIGMATISM
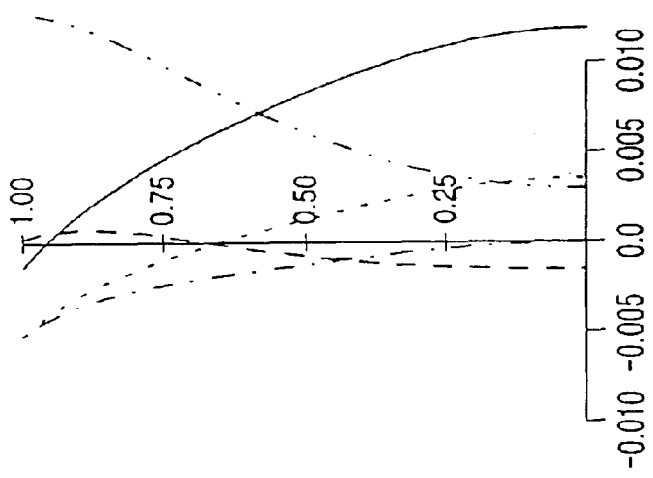
Fig.18A SPHERICAL ABERRATION

IMAGING OPTICAL SYSTEM AND OPTICAL APPARATUS USING THE SAME

BACKGROUND OF THE INVENTION

1. Field of the Invention

This invention relates to a variable magnification lens which is capable of changing an imaging magnification in accordance with the purpose of use and an optical system which is capable of photographing an image recorded by a film at a magnification most suitable for the film, and to an optical apparatus, such as an image transforming apparatus, using this optical system.

2. Description of Related Art

Imaging optical systems which are designed to be both-side telecentric and to change the imaging magnification have been proposed, for example, by Japanese Patent Kokai No. 2001-27726 and Japanese Patent No. 2731481.

The optical system set forth in Kokai No. 2001-27726 includes, in order from the object side, the first lens unit with positive refractive power, the second lens unit with positive refractive power, the third lens unit with negative refractive power, and is the fourth lens unit with positive refractive power. This optical system is thus constructed to be both-side telecentric and to change the imaging magnification.

The optical system set forth in U.S. Pat. No. 2,731,481 includes, in order from the object side, the first lens unit with positive refractive power, the second lens unit with negative refractive power, and the third lens unit with positive refractive power. This optical system is thus constructed to be both-side telecentric and to change the imaging magnification while keeping an object-to-image distance constant.

SUMMARY OF THE INVENTION

The imaging optical system of the present invention includes a variable magnification optical system comprising, in order from the object side toward the image side, a first lens unit with positive refractive power, a second lens unit with positive refractive power, a third lens unit with negative refractive power, a fourth lens unit with positive refractive power, and an aperture stop interposed between the third lens unit and the fourth lens unit. The variable magnification optical system changes an imaging magnification while keeping an object-to-image distance constant. The imaging magnification is changed by varying spacing between the first lens unit and the second lens unit, spacing between the second lens unit and the third lens unit, and spacing between the third lens unit and the fourth lens unit. When the imaging magnification is changed, the imaging optical system satisfies the following conditions in at least one variable magnification state:

$$|En|/L > 0.4$$

$$|Ex|/|L/\beta| > 0.4$$

where En is a distance from a first lens surface on the object side of the variable magnification optical system to the entrance pupil of the imaging optical system, L is the object-to-image distance of the imaging optical system, Ex is a distance from the most image-side lens surface of the variable magnification optical system to the exit pupil of the imaging optical system, and $\beta$ is the magnification of the entire system of the imaging optical system.

The imaging optical system of the present invention preferably satisfies the following conditions:

$$1.0 < MAXFNO < 8.0$$

$$|\Delta FNO/\Delta\beta| < 5$$

where MAXFNO is the smallest object-side F-number where the imaging magnification of the imaging optical system is changed, $\Delta FNO$ is a difference between the object-side F-number at the minimum magnification and the object-side F-number at the maximum magnification in the entire system of the imaging optical system, and $\Delta\beta$ is a difference between the minimum magnification and the maximum magnification in the entire system of the imaging optical system.

The imaging optical system of the present invention preferably satisfies the following condition:

$$0.6 < |(R3f+R3b)/(R3f-R3b)| < 5.0$$

where R3f is the radius of curvature of the most object-side surface of the third lens unit and R3b is the radius of curvature of the most image-side surface of the third lens unit.

The imaging optical system of the present invention is preferably constructed so that the most object-side lens of the first lens unit has positive refractive power.

The imaging optical system of the present invention is preferably constructed so that the first lens unit includes, in order from the object side, a lens with positive refractive power, a lens with negative refractive power, and a lens with positive refractive power.

The imaging optical system of the present invention is preferably constructed so that the third lens unit includes at least two meniscus lenses, each with a convex surface directed toward the object side.

The imaging optical system of the present invention is preferably constructed so that the third lens unit includes two meniscus lenses, each with negative refractive power, and one meniscus lens with positive refractive power.

In the present invention, an optical apparatus using the imaging optical system of the present invention is provided.

According to the present invention, the imaging optical system in which even when the imaging magnification is changed, the object-to-image distance remains unchanged and the fluctuation of the F-number is minimized, and the optical apparatus using the imaging optical system can be provided.

These and other features and advantages of the present invention will become apparent from the following detailed description of the preferred embodiments when taken in conjunction with the accompanying drawings.

BRIEF DESCRIPTION OF THE DRAWINGS

FIGS. 2A, 2B, and 2C are diagrams showing aberration characteristics in focusing at an imaging magnification of 0.4× of the imaging optical system in the first embodiment;

FIGS. 4A, 4B, and 4C are diagrams showing aberration characteristics in focusing at an imaging magnification of 0.4× of the imaging optical system in the second embodiment;

FIGS. 6A, 6B, and 6C are diagrams showing aberration characteristics in focusing at an imaging magnification of 0.4× of the imaging optical system in the third embodiment;

FIGS. 8A, 8B, and 8C are diagrams showing aberration characteristics in focusing at an imaging magnification of 0.4× of the imaging optical system in the fourth embodiment;

FIGS. 9A, 9B, and 9C are sectional views showing optical arrangements, developed along the optical axis, at magnifications of 0.3×, 0.4×, and 0.5×, respectively, of a fifth embodiment of the imaging optical system according to the present invention;

FIGS. 10A, 10B, and 10C are diagrams showing aberration characteristics in focusing at an imaging magnification of 0.4× of the imaging optical system in the fifth embodiment;

FIGS. 12A, 12B, and 12C are diagrams showing aberration characteristics in focusing at an imaging magnification of 0.4× of the imaging optical system in the sixth embodiment;

FIGS. 14A, 14B, and 14C are diagrams showing aberration characteristics in focusing at an imaging magnification of 0.4× of the imaging optical system in the seventh embodiment;

FIGS. 15A, 15B, and 15C are sectional views showing optical arrangements, developed along the optical axis, at magnifications of 0.3×, 0.4×, and 0.5×, respectively, of an eighth embodiment of the imaging optical system according to the present invention;

FIGS. 16A, 16B, and 16C are diagrams showing aberration characteristics in focusing at an imaging magnification of 0.4× of the imaging optical system in the eighth embodiment;

FIGS. 18A, 18B, and 18C are diagrams showing aberration characteristics in focusing at an imaging magnification of 0.4× of the imaging optical system in the ninth embodiment;

DETAILED DESCRIPTION OF THE PREFERRED EMBODIMENTS

Figure 1A:
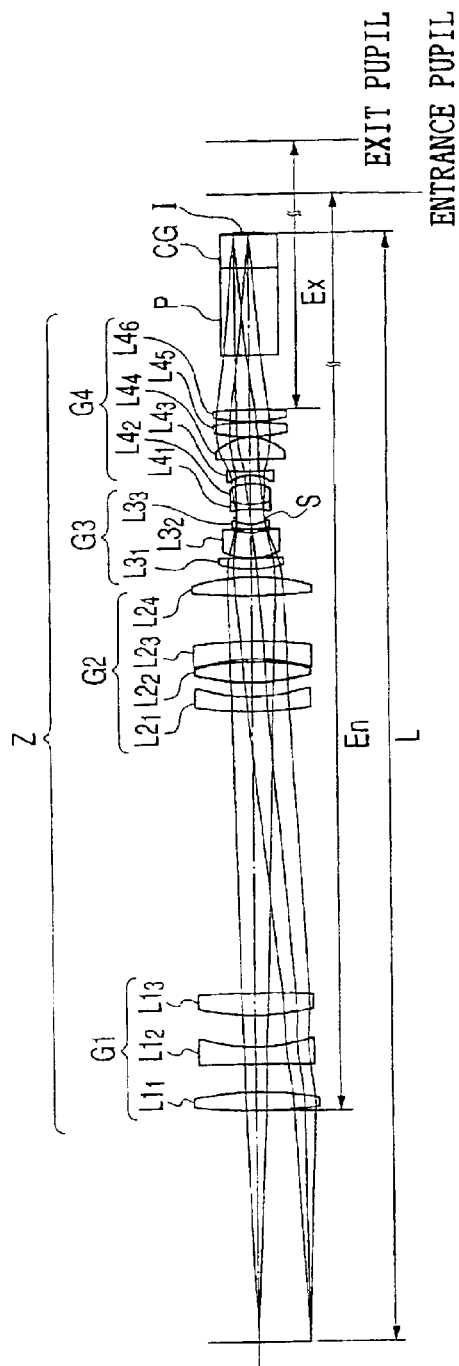
FIGS. 1A, 1B, and 1C are sectional views showing optical arrangements, developed along the optical axis, at magnifications of 0.3×, 0.4×, and 0.5×, respectively, of a first embodiment of the imaging optical system according to the present invention.

Before undertaking the description of the embodiments, the function and effect of the present invention will be explained.

In the imaging optical system of the present invention, as described above, the variable magnification optical system includes four lens units with positive, positive, negative, and positive refractive powers. Ahead of (or on the object side of) the stop, the first lens unit with positive refractive power, the second lens unit with positive refractive power, and the third lens unit with negative refractive power are arranged so that the whole of these lens units constitutes a lens system with positive refractive power. The fourth lens unit located behind (or on the image side of) the stop constitutes a lens system with positive refractive power. The aperture stop is interposed between the third lens unit and the fourth lens unit.

The imaging optical system of the present invention is designed to change the imaging magnification while keeping the object-to-image distance constant. That is, the imaging optical system of the present invention is an optical system in which a conjugate length is fixed.

The imaging optical system of the present invention is constructed so that when the imaging magnification is changed, the imaging optical system satisfies the following conditions in at least one variable magnification state and is both-side telecentric:

$$|En|/L > 0.4 \quad (1)$$

$$|Ex|/|L/\beta| > 0.4 \quad (2)$$

where En is a distance from a first lens surface on the object side of the variable magnification optical system to the entrance pupil of the imaging optical system, L is the object-to-image distance of the imaging optical system, Ex is a distance from the most image-side lens surface of the variable magnification optical system to the exit pupil of the imaging optical system, and β is the magnification of the entire system of the imaging optical system.

The imaging optical system of the present invention is constructed so that the stop is located at the focal position of the lens system made up of the first to third lens units lying on the object side of the stop. By this arrangement, the entrance pupil which is the image of the stop is projected at infinity. As a result, the imaging optical system of the present invention constitutes an object-side telecentric optical system.

Further, the imaging optical system of the present invention is constructed so that the stop is located at the focal position of the lens system of the fourth lens unit lying on the image side of the stop. By this arrangement, the exit pupil which is the image of the stop is projected at infinity. As a result, the imaging optical system of the present invention also constitutes an image-side telecentric optical system.

In the imaging optical system of the present invention constructed as mentioned above, the role of a multi-variator is allotted to each of the second lens unit with positive refractive power and the third lens unit with negative refractive power. Whereby, a synthesized focal length of the first to third lens units located on the object side of the stop can be changed.

Still further, the imaging optical system of the present invention is constructed so that the stop is interposed between the third lens unit and the fourth lens unit. The fourth lens unit located on the image side of the stop has no variable magnification function. Even when the imaging magnification is changed, the shift of the position of the stop is suppressed as far as possible so that the position of the stop remains practically unchanged. An arrangement is thus made such that the stop is always located in the proximity of the focal position of the fourth lens unit, and thereby the imaging optical system is capable of changing the imaging magnification while maintaining the telecentric characteristic and the F-number on the exit side.

However, in order to maintain the object-side telecentric characteristic and fix the conjugate length while keeping the F-number constant when the imaging magnification is changed, it is necessary to satisfy conditions described below. First, even in the magnification change, the stop must be located at the synthesized focal position of the first to third lens units lying on the object side of the stop. Second, even in the magnification change, a distance from an object surface to a stop surface must be kept nearly constant.

In the lens arrangement of positive, negative, and positive refractive powers, if the first lens unit is divided into two lens units with positive and negative refractive powers, the balance between the refractive powers will be destroyed. Consequently, chromatic aberration of magnification and distortion will be increased. As in the present invention, when the first lens unit is divided into two lens units with positive and positive refractive powers and the optical system is constructed with four lens units with positive, positive, negative, and positive refractive powers, the amount of the production of aberration can be minimized.

In the both-side telecentric optical system, even when the magnification is changed, an off-axis ray of light at the position of the stop is nearly parallel to the optical axis. On the image side of the stop, only the fourth lens unit is located, and it is not moved, thus making the focal length constant. Hence, when the magnification is changed, the fluctuation of the image-side F-number is minimized, and it is not necessary to adjust the brightness of a camera even in this case.

When the object-side telecentric optical system is constructed like the imaging optical system of the present invention, the following advantages are obtained. To explain this, a telecine apparatus (a motion picture film scanner) is cited as an example. The telecine apparatus is adapted to digitize the motion picture film. The telecine apparatus is constructed so that the film is illuminated by an illumination optical system and an image is formed by a solid-state image sensor, such as a CCD, through the imaging optical system.

However, when the imaging optical system of the telecine apparatus is constructed to be object-side telecentric like the imaging optical system of the present invention, matching of the pupil of the illumination system with the imaging system is facilitated, and a loss of the amount of light is reduced. Moreover, a change in magnification on an image plane, caused by the disturbance of flatness of the film, can be kept to a minimum.

When the image-side telecentric optical system is constructed like the imaging optical system of the present invention, the following advantages are obtained. To explain this, a so-called multi-imager camera using image sensors in accordance with colors, such as RGB, is cited as an example. In this multi-imager camera, a color separation prism is generally used. This prism has a separation interference film splitting light in accordance with wavelength, namely a dichroic film, on its interface. If the exit pupil is located close to the image plane, the angle of incidence where a chief ray is incident on the interference film will be changed in accordance with the position of an image point on the image. Consequently, the optical path length of film thickness is changed and a color separation characteristic is varied in accordance with a field angle, bringing about different color reproducibility, that is, causing color shading.

However, when the imaging optical system of the multi-imager camera is constructed to be image-side telecentric like the imaging optical system of the present invention, color shading can be suppressed.

Here, for example, it is assumed that the solid-image sensor, such as the CCD, is placed on the image side of the color separation prism. If the exit pupil is located close to the image plane, the chief ray is obliquely incident on a pixel. Thus, off-axis incident light is chiefly blocked by the structure of the CCD to decrease the amount of light, and light other than that to enter an original light-receiving section is incident. This brings about a state where a signal other than original information is output. That is, shading is caused.

However, when the image-side telecentric optical system is constructed like the imaging optical system of the present invention, shading can be suppressed.

The imaging optical system of the present invention is also constructed as the both-side telecentric optical system. Consequently, the imaging magnification can be practically determined by the ratio between the focal length of the lens units located on the object side of the stop and the focal length of the lens unit located on the image side of the stop.

Spacings between individual lens units located on the object side of the stop are changed so that the focal length of the lens units on the object side of the stop is varied. Whereby, the imaging magnification can be changed.

In the imaging optical system of the present invention, the first lens unit has the positive refractive power, and the entrance pupil which is the image of the stop is projected at infinity. In doing so, a chief ray on the object side of the first lens unit is refracted parallel to the optical axis and thereby the object-side telecentric optical system can be realized.

In the imaging optical system of the present invention, the second lens unit has the positive refractive power and the third lens unit has the negative refractive power. By changing the spacing between the second lens unit and the third lens unit, the synthesized focal length of the second and third lens units is varied. That is, the second and third lens units are designed to function as a multi-variator. Thus, the second and third lens units are moved, and thereby the magnification can be optimally adjusted to the size of an object.

When the third lens unit is designed to have the negative refractive power like the imaging optical system of the present invention, the Petzval sum is increased and an optical system which is free of curvature of field can be realized.

The imaging optical system of the present invention is also constructed so that the positive refractive power is imparted to the fourth lens unit and the exit pupil which is the image of the stop is projected at infinity. Thus, the chief ray on the image side of the fourth lens unit is rendered parallel to the optical axis, and thereby the image-side telecentric optical system can be realized.

When the imaging optical system of the present invention provided with the variable magnification function, mentioned above, is used to construct an optical apparatus, the following advantages are obtained. To explain this, for example, the telecine apparatus is cited as described above. The telecine apparatus, in which a video camera is attached to a film photographing device, is constructed so that the film image is converted into a video signal, which is digitized.

On the other hand, motion picture films have a plurality of standards, and the size of the image section of the film varies with each standard. For example, a 35 mm standard film measures 16 (height)×21.95 (width) mm and a European wide film measures 11.9×21.95 mm. In this way, the aspect ratio of the film varies according to the film standard. The dimension of the imaging surface of the CCD, for example, in a ⅔" CCD solid-state image sensor, is 5.4×9.6 mm. In order to photograph an image through superfine pixels, it is desirable to acquire image information relative to the entire CCD imaging area. For this purpose, it becomes necessary to change the imaging magnification in accordance with the film standard.

However, when the imaging optical system of the present invention is used to construct the optical apparatus, the films of various standards can be digitized, for example, in the telecine apparatus. In this case, even when the imaging magnification is changed, the conjugate length remains unchanged, and the magnification can be varied with little fluctuation in image-side F-number.

For example, when the imaging optical system of the present invention is used to construct the multi-imager camera, color shading caused by the color separation prism and shading of the CCD camera can be suppressed. Moreover, the imaging magnification can be changed, without moving the camera, in accordance with the film standard and the size of the object, and even when the magnification is changed, the adjustment of brightness is unnecessary.

In the imaging optical system of the present invention, in order to obtain further both-side telecentricity, it is favorable that when imaging magnification is changed, the imaging optical system satisfies the following conditions, instead of Conditions (1) and (2), in at least one variable magnification state:

$$|En|/L > 0.8 \quad (1')$$

$$|Ex|/|L/\beta| > 0.8 \quad (2')$$

It is more favorable to satisfy the following conditions:

$$|En|/L > 1.6 \quad (1'')$$

$$|Ex|/|L/\beta| > 1.6 \quad (2'')$$

In the imaging optical system of the present invention, the F-number is defined by the following conditions:

$$1.0 < MAXFNO < 8.0 \quad (3)$$

$$|\Delta FNO/\Delta\beta| < 5 \quad (4)$$

where MAXFNO is the smallest object-side F-number where the imaging magnification of the imaging optical system is changed, $\Delta FNO$ is a difference between the object-side F-number at the minimum magnification and the object-side F-number at the maximum magnification in the entire system of the imaging optical system, and $\Delta\beta$ is a difference between the minimum magnification and the maximum magnification in the entire system of the imaging optical system.

Also, the F-number refers to an amount expressing the brightness of the optical system. As the value of the F-number becomes small, a brighter optical system is obtained.

If the F-number is extremely small, the number of lenses must be increased in order to correct aberration. This causes the problem that the overall length of the optical system is increased. On the other hand, an extremely large F-number is not suitable for motion picture photography because of shortage in the amount of light.

However, when the optical system satisfies Condition (3), the F-number is neither extremely small nor large. The above problems that the overall length of the optical system is increased and the F-number is not suitable for motion picture photography can thus be obviated.

If the value of $|\Delta FNO/\Delta\beta|$ is extremely large, the fluctuation of the image-side F-number becomes remarkable in the magnification change. As a result, the brightness of the camera must be adjusted. However, when Condition (4) is satisfied, there is no need to adjust the brightness of the camera.

It is desirable to satisfy the following conditions:

$$2.0 < MAXFNO < 5.6 \quad (3')$$

$$|\Delta FNO/\Delta\beta| < 3 \quad (4')$$

It is more desirable to satisfy the following conditions:

$$3.0 < MAXFNO < 4.0 \quad (3'')$$

$$|\Delta FNO/\Delta\beta| < 1 \quad (4'')$$

In the imaging optical system of the present invention, it is desirable that the most object-side lens of the first lens unit has the positive refractive power. When the most object-side lens of the first lens unit is constructed as the positive lens, an off-axis beam of light can be lowered and thus aberration becomes small.

In the imaging optical system of the present invention, it is desirable that the first lens unit includes, in order from the object side, positive, negative, and positive lenses. When the first lens unit is constructed with the positive, negative, and positive lenses, chromatic aberration of magnification and off-axis chromatic aberration can be corrected.

In the imaging optical system of the present invention, it is desirable to satisfy a condition described below. When this condition is satisfied, the fluctuation of off-axis aberration can be kept to a minimum.

$$0.6 < |(R3f+R3b)/(R3f-R3b)| < 5.0 \quad (5)$$

where $|(R3f+R3b)/(R3f-R3b)|$ is a virtual shape factor, R3f is the radius of curvature of the most object-side surface of the third lens unit and R3b is the radius of curvature of the most image-side surface of the third lens unit.

Beyond the upper limit of the virtual shape factor, the radius of curvature of the most object-side surface of the third lens unit approximates that of the most imageside surface of the third lens unit. As such, the refractive power of the third lens unit becomes extremely weak. Consequently, when the imaging magnification is changed, the amount of movement of the third lens unit must be increased. When the amount of movement of the third lens unit is large, the ray height of off-axis light incident on the third lens unit fluctuates. Thus, the fluctuation of off-axis aberration becomes pronounced. Below the lower limit of the virtual shape factor, the refractive power of the third lens unit becomes extremely strong. As a result, the angle of incidence of the off-axis beam on the third lens unit is increased, and the fluctuation of off-axis aberration caused by the movement of the third lens unit becomes heavy.

However, when Condition (5) is satisfied, the refractive power of the third lens unit is neither extremely high nor low, and the above problem that the fluctuation of off-axis aberration is heavy can be obviated.

It is desirable to satisfy the following condition:

$$1.2 < |(R3f+R3b)/(R3f-R3b)| < 3.5 \quad (5')$$

It is more desirable to satisfy the following condition:

$$2.0 < |(R3f+R3b)/(R3f-R3b)| < 3.0 \quad (5'')$$

In the imaging optical system of the present invention, it is desirable that the third lens unit has at least two meniscus lenses, each with a convex surface directed toward the object side. It is more desirable that the third lens unit has at least three meniscus lenses. More specifically, it is desirable that the third lens unit, for example, has two negative meniscus lenses, each with a convex surface directed toward the object side, and one positive meniscus lens with a convex surface directed toward the object side. Since the third lens unit is located close to the stop, off-axis rays are incident on the lenses of the third lens unit at almost the same angle, irrespective of the angle of view.

However, the meniscus lens in which a convex surface is directed toward the object side, namely the object-side surface has the positive refractive power, has nearly minimum deflection angles with respect to on- and off-axis light beams at individual angles of view, and hence the production of aberration can be prevented.

In accordance with the drawings, the embodiments of the present invention will be described below.

First Embodiment

Figure 1B:
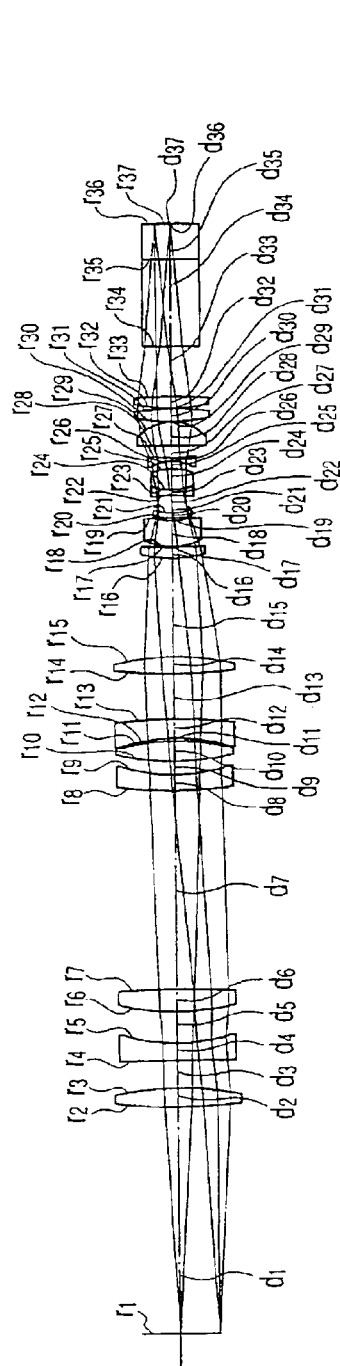
Figure 1C:
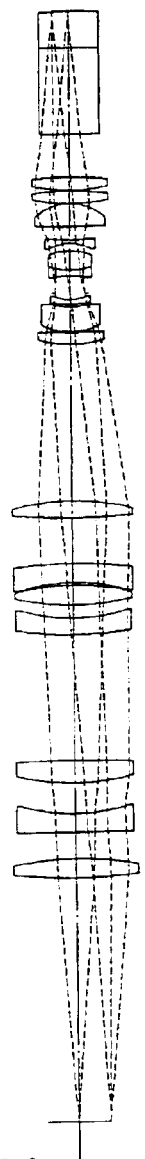

FIGS. 1A, 1B, and 1C show optical arrangements, developed along the optical axis, at magnifications of 0.3×, 0.4×, and 0.5×, respectively, of the first embodiment of the imaging optical system according to the present invention. FIGS. 2A, 2B, and 2C show aberration characteristics in focusing at an imaging magnification of 0.4× of the imaging optical system in the first embodiment.

The imaging optical system of the first embodiment has a variable magnification optical system Z. In FIG. 1A, reference symbol P represents a prism, CG represents a cover glass, and I represents an imaging surface.

The variable magnification optical system Z comprises, in order from the object side toward the image side, a first lens unit G1 with positive refractive power, a second lens unit G2 with positive refractive power, a third lens unit G3 with negative refractive power, an aperture stop S, and a fourth lens unit G4 with positive refractive power.

The first lens unit G1 includes, in order from the object side, a biconvex lens $L1_1$, a biconcave lens $L1_2$, and a biconvex lens $L1_3$.

The second lens unit G2 includes, in order from the object side, a negative meniscus lens $L2_1$ with a convex surface directed toward the object side, a biconvex lens $L2_2$, a negative meniscus lens $L2_3$ with a concave surface directed toward the object side, and a biconvex lens $L2_4$.

The third lens unit G3 includes a positive meniscus lens $L3_1$ with a convex surface directed toward the object side, a negative meniscus lens $L3_2$ with a convex surface directed toward the object side, and a negative meniscus lens $L3_3$ with a convex surface directed toward the object side.

The fourth lens unit G4 includes a cemented doublet of a biconcave lens $L4_1$ and a biconvex lens $L4_2$, a biconcave lens $L4_3$, a biconvex lens $L4_4$, a biconvex lens $L4_5$, and a biconvex lens $L4_6$.

When the magnification is changed from 0.3× to 0.5× in focusing of an infinite object point, the first lens unit G1, after being moved once toward the object side, is moved toward the image side, the second lens unit G2 is moved toward the object side, the third lens unit G3 is moved toward the image side together with the stop S, and the fourth lens unit G4 is moved toward the image side so that spacing between the third and fourth lens units G3 and G4 is slightly widened. Also, the object-to-image distance in the magnification change is kept constant.

Subsequently, numerical data of optical members constituting the imaging optical system of the first embodiment are shown below. In the numerical data, $r_0, r_1, r_2, \ldots$ denote radii of curvature of surfaces of individual optical members shown in this order from the object side; $d_0, d_1, d_2, \ldots$ denote thicknesses (mm) of individual optical members or air spacings between them; $n_{e1}, n_{e2}, \ldots$ denote refractive indices of individual optical members at the e line; $v_{e1}, v_{e2}, \ldots$ denote Abbe's numbers of individual optical members at the e line. These symbols are also used for the numerical data of other embodiments to be described later.

Numerical data 1

Image height: 5.783
$r_0 = \infty$ (object)
$\quad d_0 = 50.000$
$r_1 = \infty$ (object surface)
$\quad d_1 = D1$
$r_2 = 189.5313$
$\quad d_2 = 7.308 \quad n_{e2} = 1.48915 \quad v_{e2} = 70.04$
$r_3 = -117.0877$
$\quad d_3 = 10.588$
$r_4 = -6124.8097$
$\quad d_4 = 6.910 \quad n_{e4} = 1.61639 \quad v_{e4} = 44.15$
$r_5 = 67.5133$
$\quad d_5 = 12.028$
$r_6 = 88.2299$
$\quad d_6 = 8.685 \quad n_{e6} = 1.43985 \quad v_{e6} = 94.53$
$r_7 = -425.3119$
$\quad d_7 = D7$
$r_8 = 148.1127$
$\quad d_8 = 6.000 \quad n_{e8} = 1.61639 \quad v_{e8} = 44.15$
$r_9 = 64.7754$
$\quad d_9 = 5.355$
$r_{10} = 88.2208$
$\quad d_{10} = 8.016 \quad n_{e10} = 1.43985 \quad v_{e10} = 94.53$
$r_{11} = -81.9368$
$\quad d_{11} = 1.062$
$r_{12} = -69.6148$
$\quad d_{12} = 7.000 \quad n_{e12} = 1.61639 \quad v_{e12} = 44.15$
$r_{13} = -171.6506$
$\quad d_{13} = 17.627$
$r_{14} = 210.1703$
$\quad d_{14} = 6.814 \quad n_{e14} = 1.43985 \quad v_{e14} = 94.53$
$r_{15} = -82.3361$
$\quad d_{15} = D15$
$r_{16} = 40.6305$
$\quad d_{16} = 4.323 \quad n_{e16} = 1.69417 \quad v_{e16} = 30.83$
$r_{17} = 250.0598$
$\quad d_{17} = 0.300$
$r_{18} = 25.0517$
$\quad d_{18} = 9.360 \quad n_{e18} = 1.72538 \quad v_{e18} = 34.47$
$r_{19} = 21.5375$
$\quad d_{19} = 1.156$
$r_{20} = 41.2143$
$\quad d_{20} = 2.000 \quad n_{e20} = 1.72538 \quad v_{e20} = 34.47$
$r_{21} = 15.8016$
$\quad d_{21} = 2.560$
$r_{22} = \infty$ (aperture stop)
$\quad d_{22} = D22$
$r_{23} = -29.2488$
$\quad d_{23} = 2.000 \quad n_{e23} = 1.61669 \quad v_{e23} = 44.02$
$r_{24} = 23.4936$
$\quad d_{24} = 7.647 \quad n_{e24} = 1.48915 \quad v_{e24} = 70.04$
$r_{25} = -17.8845$
$\quad d_{25} = 3.043$
$r_{26} = -13.7038$
$\quad d_{26} = 1.417 \quad n_{e26} = 1.61639 \quad v_{e26} = 44.15$
$r_{27} = 89.8893$
$\quad d_{27} = 4.829$ -continued Numerical data 1

$r_{28} = 707.1568$
$d_{28} = 8.564$  $n_{e28} = 1.43985$  $v_{e28} = 94.53$
$r_{29} = -18.1649$
$d_{29} = 0.325$
$r_{30} = 69.4722$
$d_{30} = 5.111$  $n_{e30} = 1.43985$  $v_{e30} = 94.53$
$r_{31} = -90.8646$
$d_{31} = 0.300$
$r_{32} = 62.9985$
$d_{32} = 4.778$  $n_{e32} = 1.43985$  $v_{e32} = 94.53$
$r_{33} = -179.4454$
$d_{33} = D33$
$r_{34} = \infty$
$d_{34} = 33.000$  $n_{e34} = 1.61173$  $v_{e34} = 46.30$
$r_{35} = \infty$
$d_{35} = 13.200$  $n_{e35} = 1.51825$  $v_{e35} = 63.93$
$r_{36} = \infty$
$d_{36} = 0.500$
$r_{37} = \infty$ (imaging surface)
$d_{37} = 0.000$ Zoom data

|  | 0.3× | 0.4× | 0.5× |
| --- | --- | --- | --- |
| D1 | 39.880 | 37.812 | 44.358 |
| D7 | 109.204 | 77.238 | 48.939 |
| D15 | 3.000 | 37.903 | 60.723 |
| D22 | 3.552 | 4.754 | 6.263 |
| D33 | 21.051 | 18.980 | 16.405 |

Parameters of conditions

| Magnification: β | 0.3× | 0.4× | 0.5× |
| --- | --- | --- | --- |
| Entrance pupil position: En | 1160.856 | 20252.775 | −1133.552 |
| Object-to-image distance: L | 428.492 | 428.492 | 428.492 |
| \|En\|/L | 2.709 | 47.265 | 2.645 |
| Exit pupil position: Ex | −352.468 | −578.834 | −1818.976 |
| \|Ex\|/\|L/β\| | 0.247 | 0.540 | 2.123 |
| F-number: FNO | 3.500 | 3.536 | 3.598 |
| FNO fluctuation: ΔFNO |  | 0.098 |  |
| \|ΔFNO/Δβ\| |  | 0.490 |  |
| Object-side radius of curvature: R3f |  | 40.630 |  |
| Image-side radius of curvature: R3b |  | 15.802 |  |
| \|(R3f + F3b)/(R3f − R3b)\| |  | 2.273 |  |

Second Embodiment

Figure 3A:
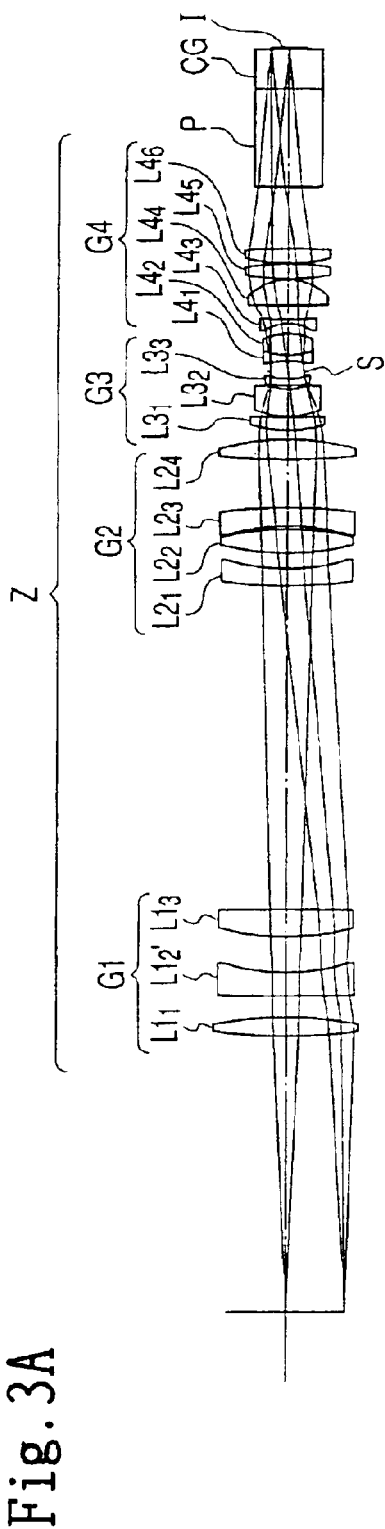
FIGS. 3A, 3B, and 3C are sectional views showing optical arrangements, developed along the optical axis, at magnifications of 0.3×, 0.4×, and 0.5×, respectively, of a second embodiment of the imaging optical system according to the present invention.
Figure 3B:
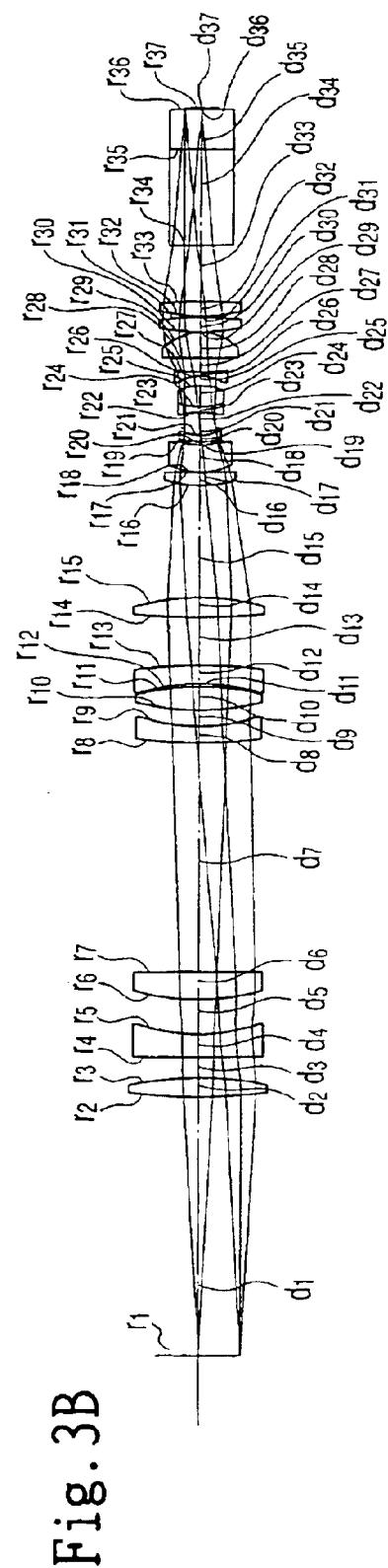
Figure 3C:
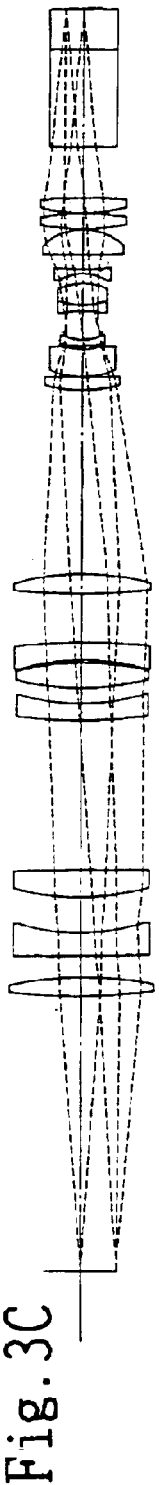

FIGS. 3A, 3B, and 3C show optical arrangements, developed along the optical axis, at magnifications of 0.3×, 0.4×, and 0.5×, respectively, of the second embodiment of the imaging optical system according to the present invention. FIGS. 4A, 4B, and 4C show aberration characteristics in focusing at a magnification of 0.4× of the imaging optical system in the second embodiment.

The imaging optical system of the second embodiment has the variable magnification optical system Z.

The variable magnification optical system Z comprises, in order from the object side toward the image side, the first lens unit G1 with positive refractive power, the second lens unit G2 with positive refractive power, the third lens unit G3 with negative refractive power, the aperture stop S, and the fourth lens unit G4 with positive refractive power.

The first lens unit G1 includes, in order from the object side, the biconvex lens $L1_1$, a negative meniscus lens $L1_2'$ with a convex surface directed toward the object side, and the biconvex lens $L1_3$.

The second lens unit G2, in order from the object side, the negative meniscus lens $L2_1$ with a convex surface directed toward the object side, the biconvex lens $L2_2$, the negative meniscus lens $L2_3$ with a concave surface directed toward the object side, and the biconvex lens $L2_4$.

The third lens unit G3 includes the positive meniscus lens $L3_1$ with a convex surface directed toward the object side, the negative meniscus lens $L3_2$ with a convex surface directed toward the object side, and the negative meniscus lens $L3_3$ with a convex surface directed toward the object side.

The fourth lens unit G4 includes the cemented doublet of the biconcave lens $L4_1$ and the biconvex lens $L4_2$, the biconcave lens $L4_3$, the biconvex lens $L4_4$, the biconvex lens $L4_5$, and the biconvex lens $L4_6$.

When the magnification is changed from 0.3× to 0.5× in focusing of the infinite object point, the first lens unit G1, after being moved once toward the object side, is moved toward the image side, the second lens unit G2 is moved toward the object side, the third lens unit G3 remains fixed together with the stop S, and the fourth lens unit G4 is moved toward the image side so that the spacing between the third and fourth lens units G3 and G4 is slightly widened. Also, the object-to-image distance in the magnification change is kept constant. Subsequently, numerical data of optical members constituting the imaging optical system of the second embodiment are shown below.

Numerical data 2

Image height: 5.783
$r_0 = \infty$ (object)
$d_0 = 50.000$
$r_1 = \infty$ (object surface)
$d_1 = D1$
$r_2 = 172.4277$
$d_2 = 6.648$  $n_{e2} = 1.48915$  $v_{e2} = 70.04$
$r_3 = -112.2625$
$d_3 = 7.313$
$r_4 = 1492.6672$
$d_4 = 7.985$  $n_{e4} = 1.61639$  $v_{e4} = 44.15$
$r_5 = 62.4069$
$d_5 = 12.125$
$r_6 = 79.8565$
$d_6 = 9.415$  $n_{e6} = 1.43985$  $v_{e6} = 94.53$
$r_7 = -1585.7009$
$d_7 = D7$
$r_8 = 151.8708$
$d_8 = 6.000$  $n_{e8} = 1.61639$  $v_{e8} = 44.15$
$r_9 = 64.4718$
$d_9 = 5.384$
$r_{10} = 86.7203$
$d_{10} = 8.163$  $n_{e10} = 14.3985$  $v_{e10} = 94.53$
$r_{11} = -80.8037$
$d_{11} = 1.049$
$r_{12} = -68.7719$
$d_{12} = 6.410$  $n_{e12} = 1.61639$  $v_{e12} = 44.15$
$r_{13} = -178.7270$
$d_{13} = 16.603$
$r_{14} = 219.0646$
$d_{14} = 6.722$  $n_{e14} = 1.43985$  $v_{e14} = 94.53$
$r_{15} = -81.1984$
$d_{15} = D15$
$r_{16} = 40.1465$
$d_{16} = 4.375$  $n_{e16} = 1.69417$  $v_{e16} = 30.83$
$r_{17} = 229.4681$
$d_{17} = 0.300$ -continued Numerical data 2

$r_{18} = 24.8118$
$d_{18} = 9.366$   $n_{e18} = 1.72538$   $v_{e18} = 34.47$
$r_{19} = 21.1952$
$d_{19} = 1.169$
$r_{20} = 40.9998$
$d_{20} = 2.000$   $n_{e20} = 1.72538$   $v_{e20} = 34.47$
$r_{21} = 15.9793$
$d_{21} = 2.555$
$r_{22} = \infty$ (aperature stop)
$d_{22} = D22$
$r_{23} = -29.1565$
$d_{23} = 2.000$   $n_{e23} = 1.61669$   $v_{e23} = 44.02$
$r_{24} = 23.6864$
$d_{24} = 7.373$   $n_{e24} = 1.48915$   $v_{e24} = 70.04$
$r_{25} = -18.0561$
$d_{25} = 3.435$
$r_{26} = -13.7966$
$d_{26} = 1.355$   $n_{e26} = 1.61639$   $v_{e26} = 44.15$
$r_{27} = 84.7189$
$d_{27} = 4.778$
$r_{28} = 547.3608$
$d_{28} = 8.544$   $n_{e28} = 1.43985$   $v_{e28} = 94.53$
$r_{29} = -18.0837$
$d_{29} = 0.300$
$r_{30} = 70.0296$
$d_{30} = 5.063$   $n_{e30} = 1.43985$   $v_{e30} = 94.53$
$r_{31} = -93.9274$
$d_{31} = 0.388$
$r_{32} = 58.3720$
$d_{32} = 4.869$   $n_{e32} = 1.43985$   $v_{e32} = 94.53$
$r_{33} = -203.9907$
$d_{33} = D33$
$r_{34} = \infty$
$d_{34} = 33.000$   $n_{e34} = 1.61173$   $v_{e34} = 46.30$
$r_{35} = \infty$
$d_{35} = 13.200$   $n_{e35} = 1.51825$   $v_{e35} = 63.93$
$r_{36} = \infty$
$d_{36} = 0.500$
$r_{37} = \infty$ (imaging surface)
$d_{37} = 0.000$ Zoom data

|     | 0.3× | 0.4× | 0.5× |
|-----|------|------|------|
| D1  | 43.904 | 39.311 | 43.788 |
| D7  | 110.381 | 79.183 | 50.950 |
| D15 | 3.089 | 38.880 | 62.637 |
| D22 | 3.559 | 5.250 | 7.195 |
| D33 | 20.639 | 18.949 | 17.003 |

Parameters of conditions

| Magnification: β | 0.3× | 0.4× | 0.5× |
|---|---|---|---|
| Entrance pupil position: En | 1124.667 | 16516.516 | −1141.823 |
| Object-to-image distance: L | 429.959 | 429.959 | 429.959 |
| \|En\|/L | 2.616 | 38.414 | 2.656 |
| Exit pupil position: Ex | −351.154 | −741.700 | 24496.963 |
| \|Ex\|/\|L/β\| | 0.245 | 0.690 | 28.488 |
| F-number: FNO | 3.500 | 3.560 | 3.646 |
| FNO fluctuation: ΔFNO | | 0.146 | |
| \|ΔFNO/Δβ\| | | 0.729 | |
| Object-side radius of curvature: R3f | | 38.452 | |

Parameters of conditions

| Magnification: β | 0.3× | 0.4× | 0.5× |
|---|---|---|---|
| Image-side radius of curvature: R3b | | 17.589 | |
| \|(R3f + R3b)/(R3f − R3b)\| | | 2.686 | |

Third Embodiment

Figure 5A:
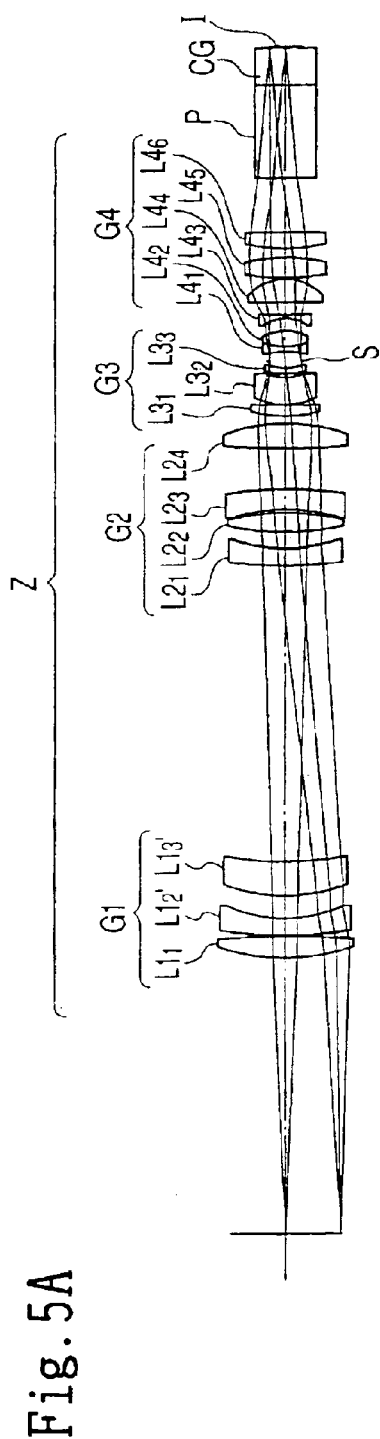
FIGS. 5A, 5B, and 5C are sectional views showing optical arrangements, developed along the optical axis, at magnifications of 0.3×, 0.4×, and 0.5×, respectively, of a third embodiment of the imaging optical system according to the present invention.
Figure 5B:
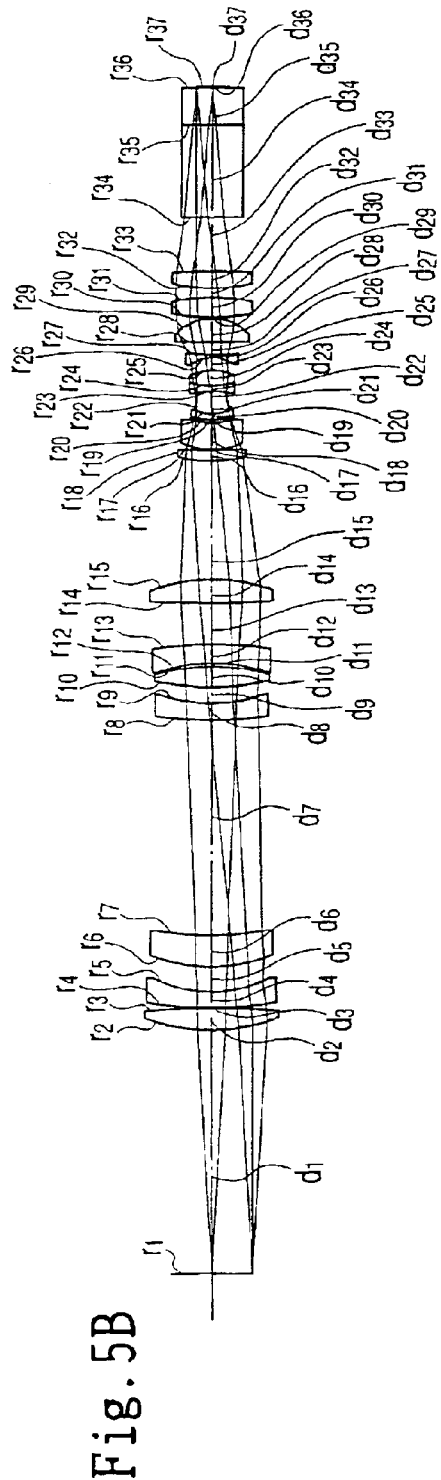
Figure 5C:
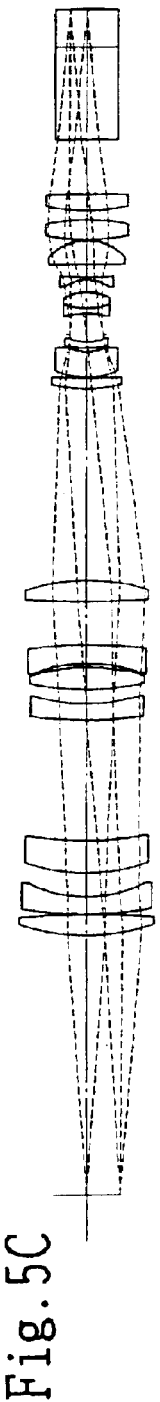

FIGS. 5A, 5B, and 5C show optical arrangements, developed along the optical axis, at magnifications of 0.3×, 0.4×, and 0.5×, respectively, of the third embodiment of the imaging optical system according to the present invention. FIGS. 6A, 6B, and 6C show aberration characteristics in focusing at a magnification of 0.4× of the imaging optical system in the third embodiment.

The imaging optical system of the third embodiment has the variable magnification optical system Z.

The variable magnification optical system Z comprises, in order from the object side toward the image side, the first lens unit G1 with positive refractive power, the second lens unit G2 with positive refractive power, the third lens unit G3 with negative refractive power, the aperture stop S, and the fourth lens unit G4 with positive refractive power.

The first lens unit G1 includes, in order from the object side, the biconvex lens L1$_1$, the negative meniscus lens L1$_2$' with a convex surface directed toward the object side, and a positive meniscus lens L1$_3$' with a convex surface directed toward the object side.

The second lens unit G2, in order from the object side, the negative meniscus lens L2$_1$ with a convex surface directed toward the object side, the biconvex lens L2$_2$, the negative meniscus lens L2$_3$ with a concave surface directed toward the object side, and the biconvex lens L2$_4$.

The third lens unit G3 includes the positive meniscus lens L3$_1$ with a convex surface directed toward the object side, the negative meniscus lens L3$_2$ with a convex surface directed toward the object side, and the negative meniscus lens L3$_3$ with a convex surface directed toward the object side.

The fourth lens unit G4 includes the cemented doublet of the biconcave lens L4$_1$ and the biconvex lens L4$_2$, the biconcave lens L4$_3$, the biconvex lens L4$_4$, the biconvex lens L4$_5$, and the biconvex lens L4$_6$.

When the magnification is changed from 0.3× to 0.5× in focusing of the infinite object point, the first lens unit G1, after being moved once toward the object side, is moved toward the image side, the second lens unit G2 is moved toward the object side, the third lens unit G3 is moved toward the object side together with the stop S so that the spacing between the third and fourth lens units G3 and G4 is slightly widened, and the fourth lens unit G4 remains fixed. Also, the object-to-image distance in the magnification change is kept constant.

Subsequently, numerical data of optical members constituting the imaging optical system of the third embodiment are shown below.

Numerical data 3

Image height: 5.783
$r_0 = \infty$ (object)
$d_0 = 50.000$

-continued

Numerical data 3

$r_1 = \infty$ (object surface)
$d_1 = D1$
$r_2 = 67.5689$
$d_2 = 7.816$  $n_{e2} = 1.48915$  $\nu_{e2} = 70.04$
$r_3 = -335.3716$
$d_3 = 0.300$
$r_4 = 140.6380$
$d_4 = 6.025$  $n_{e4} = 1.61639$  $\nu_{e4} = 44.15$
$r_5 = 45.2535$
$d_5 = 8.810$
$r_6 = 57.6476$
$d_6 = 11.963$  $n_{e6} = 1.43985$  $\nu_{e6} = 94.53$
$r_7 = 109.0130$
$d_7 = D7$
$r_8 = 140.9050$
$d_8 = 6.209$  $n_{e8} = 1.61639$  $\nu_{e8} = 44.15$
$r_9 = 59.1517$
$d_9 = 5.421$
$r_{10} = 89.7738$
$d_{10} = 7.460$  $n_{e10} = 1.43985$  $\nu_{e10} = 94.53$
$r_{11} = -74.4487$
$d_{11} = 1.335$
$r_{12} = -57.6329$
$d_{12} = 7.000$  $n_{e12} = 1.61639$  $\nu e_{12} = 44.15$
$r_{13} = -145.4391$
$d_{13} = 15.344$
$r_{14} = 312.0611$
$d_{14} = 8.089$  $n_{e14} = 1.43985$  $\nu_{e14} = 94.53$
$r_{15} = -66.7614$
$d_{15} = D15$
$r_{16} = 42.2336$
$d_{16} = 4.331$  $n_{e16} = 1.69417$  $\nu_{e16} = 30.83$
$r_{17} = 254.0344$
$d_{17} = 0.300$
$r_{18} = 24.1640$
$d_{18} = 9.326$  $n_{e18} = 1.72538$  $\nu_{e18} = 34.47$
$r_{19} = 20.0169$
$d_{19} = 1.206$
$r_{20} = 36.3821$
$d_{20} = 2.000$  $n_{e20} = 1.72538$  $\nu_{e20} = 34.47$
$r_{21} = 16.7574$
$d_{21} = 2.601$
$r_{22} = \infty$ (aperture stop)
$d_{22} = D22$
$r_{23} = -26.7471$
$d_{23} = 2.030$  $n_{e23} = 1.61669$  $\nu_{e23} = 44.02$
$r_{24} = 24.0157$
$d_{24} = 5.463$  $n_{e24} = 1.48915$  $\nu_{e24} = 70.04$
$r_{25} = -17.6590$
$d_{25} = 4.328$
$r_{26} = -13.4729$
$d_{26} = 1.058$  $n_{e26} = 1.61639$  $\nu_{e26} = 44.15$
$r_{27} = 93.0104$
$d_{27} = 4.726$
$r_{28} = 913.0291$
$d_{28} = 8.540$  $n_{e28} = 1.43985$  $\nu_{e28} = 94.53$
$r_{29} = -17.8834$
$d_{29} = 0.300$
$r_{30} = 81.9603$
$d_{30} = 6.985$  $n_{e30} = 1.43985$  $\nu_{e30} = 94.53$
$r_{31} = -64.2115$
$d_{31} = 3.523$
$r_{32} = 60.0466$
$d_{32} = 6.110$  $n_{e32} = 1.43985$  $\nu_{e32} = 94.53$
$r_{33} = -318.5459$
$d_{33} = 19.314$
$r_{34} = \infty$
$d_{34} = 33.000$  $n_{e34} = 1.61173$  $\nu_{e34} = 46.30$
$r_{35} = \infty$
$d_{35} = 13.200$  $n_{e35} = 1.51825$  $\nu_{e35} = 63.93$
$r_{36} = \infty$
$d_{36} = 0.500$
$r_{37} = \infty$ (imaging surface)
$d_{37} = 0.000$ Zoom data

|  | 0.3× | 0.4× | 0.5× |
|---|---|---|---|
| D1 | 50.134 | 38.319 | 43.946 |
| D7 | 107.947 | 77.883 | 43.657 |
| D15 | 3.000 | 42.757 | 69.242 |
| D22 | 3.638 | 5.759 | 7.874 |

Parameters of conditions

| Magnification: β | 0.3× | 0.4× | 0.5× |
|---|---|---|---|
| Entrance pupil position: En | 1271.479 | −18393.929 | −1095.982 |
| Object-to-image distance: L | 429.334 | 429.334 | 429.334 |
| \|En\|/L | 2.962 | 42.843 | 2.553 |
| Exit pupil position: Ex | −362.746 | −906.100 | 4824.866 |
| \|Ex\|/L/β | 0.253 | 0.844 | 5.619 |
| F-number: FNO | 3.500 | 3.593 | 3.687 |
| FNO fluctuation: ΔFNO |  | 0.187 |  |
| \|ΔFNo/Δβ\| |  | 0.935 |  |
| Object-side radius of curvature: R3f |  | 42.234 |  |
| Image-side radius of curvature: R3b |  | 16.757 |  |
| \|(R3f + R3b)/(R3f − R3b)\| |  | 2.316 |  |

Fourth Embodiment

Figure 7A:
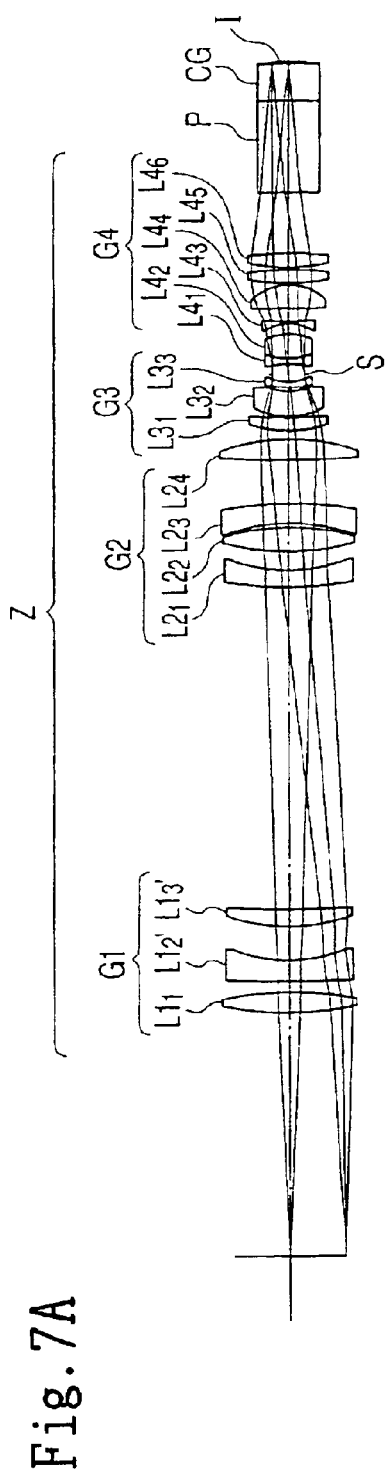
FIGS. 7A, 7B, and 7C are sectional views showing optical arrangements, developed along the optical axis, at magnifications of 0.3×, 0.4×, and 0.5×, respectively, of a fourth embodiment of the imaging optical system according to the present invention.
Figure 7B:
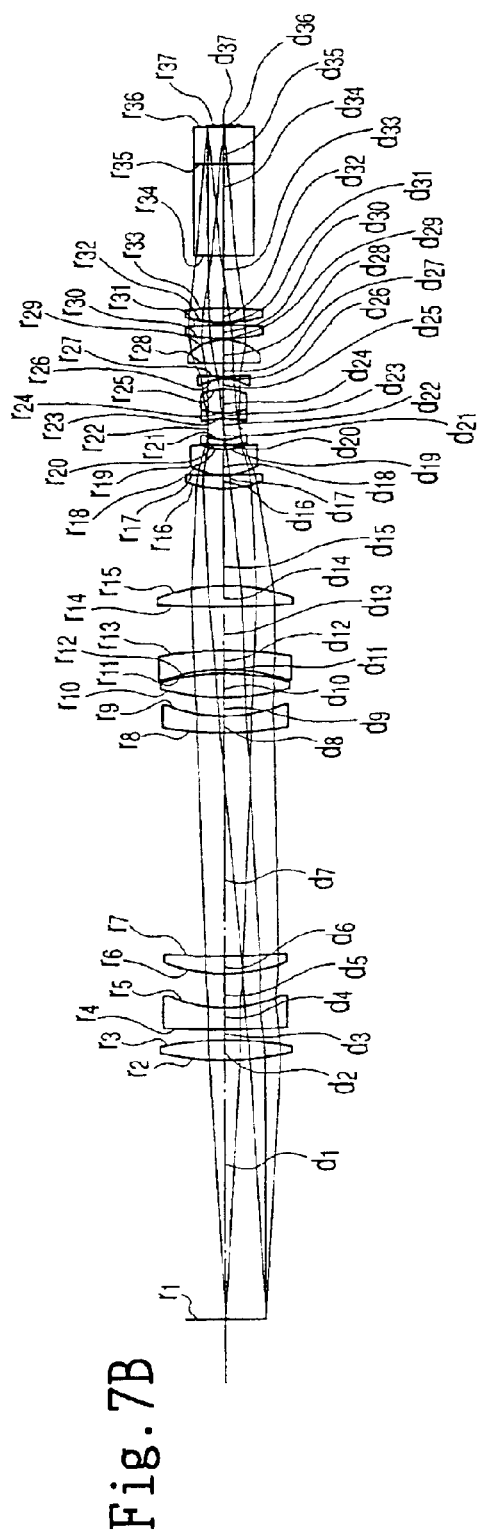
Figure 7C:
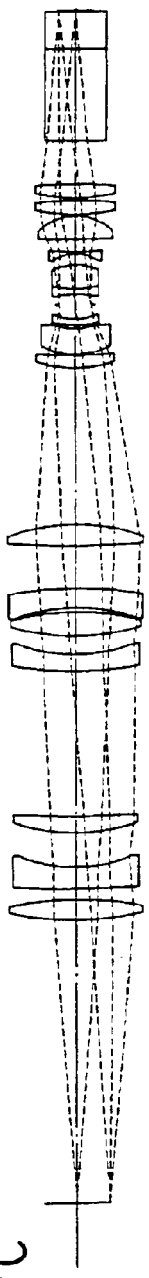

FIGS. 7A, 7B, and 7C show optical arrangements, developed along the optical axis, at magnifications of 0.3×, 0.4×, and 0.5×, respectively, of the fourth embodiment of the imaging optical system according to the present invention. FIGS. 8A, 8B, and 8C show aberration characteristics in focusing at a magnification of 0.4× of the imaging optical system in the fourth embodiment.

The imaging optical system of the fourth embodiment has the variable magnification optical system Z.

The variable magnification optical system Z comprises, in order from the object side toward the image side, the first lens unit G1 with positive refractive power, the second lens unit G2 with positive refractive power, the third lens unit G3 with negative refractive power, the aperture stop S, and the fourth lens unit G4 with positive refractive power.

The first lens unit G1 includes, in order from the object side, the biconvex lens L1$_1$, the negative meniscus lens L1$_2$' with a convex surface directed toward the object side, and the positive meniscus lens L1$_3$' with a convex surface directed toward the object side.

The second lens unit G2, in order from the object side, the negative meniscus lens L2$_1$ with a convex surface directed toward the object side, the biconvex lens L2$_2$, the negative meniscus lens L2$_3$ with a concave surface directed toward the object side, and the biconvex lens L2$_4$.

The third lens unit G3 includes the positive meniscus lens L3$_1$ with a convex surface directed toward the object side, the negative meniscus lens L3$_2$ with a convex surface directed toward the object side, and the negative meniscus lens L3$_3$ with a convex surface directed toward the object side.

The fourth lens unit G4 includes the cemented doublet of the biconcave lens L4$_1$ and the biconvex lens L4$_2$, the biconcave lens L4$_3$, the biconvex lens L4$_4$, the biconvex lens L4$_5$, and the biconvex lens L4$_6$.

When the magnification is changed from 0.3× to 0.5× in focusing of the infinite object point, the first lens unit G1 is moved toward the image side, the second lens unit G2 is moved toward the object side, the third lens unit G3 is moved toward the image side, and the fourth lens unit G4 is moved toward the image side together with the stop S so that the spacing between the third and fourth lens units G3 and G4 is slightly widened. Also, the object-to-image distance in the magnification change is kept constant.

Subsequently, numerical data of optical members constituting the imaging optical system of the fourth embodiment are shown below.

Numerical data 4

Image height: 5.783
$r_0 = \infty$ (object)
$\quad d_0 = 50.000$
$r_1 = \infty$ (object surface)
$\quad d_1 = D1$
$r_2 = 107.8560$
$\quad d_2 = 7.337 \quad n_{e2} = 1.48915 \quad \nu_{e2} = 70.04$
$r_3 = -119.7849$
$\quad d_3 = 3.971$
$r_4 = 454.1088$
$\quad d_4 = 7.857 \quad n_{e4} = 1.61639 \quad \nu_{e4} = 44.15$
$r_5 = 49.9355$
$\quad d_5 = 12.309$
$r_6 = 64.2291$
$\quad d_6 = 6.018 \quad n_{e6} = 1.43985 \quad \nu_{e6} = 94.53$
$r_7 = 300.8668$
$\quad d_7 = D7$
$r_8 = 126.3256$
$\quad d_8 = 6.000 \quad n_{e8} = 1.61639 \quad \nu_{e8} = 44.15$
$r_9 = 56.4062$
$\quad d_9 = 6.775$
$r_{10} = 81.4055$
$\quad d_{10} = 8.793 \quad n_{e10} = 1.43985 \quad \nu_{e10} = 94.53$
$r_{11} = -83.1434$
$\quad d_{11} = 1.494$
$r_{12} = -63.8486$
$\quad d_{12} = 7.000 \quad n_{e12} = 1.61639 \quad \nu_{e12} = 44.15$
$r_{13} = -133.7944$
$\quad d_{13} = 15.757$
$r_{14} = 330.3809$
$\quad d_{14} = 7.640 \quad n_{e14} = 1.43985 \quad \nu_{e14} = 94.53$
$r_{15} = -69.3107$
$\quad d_{15} = D15$
$r_{16} = 40.1299$
$\quad d_{16} = 4.652 \quad n_{e16} = 1.69417 \quad \nu_{e16} = 30.83$
$r_{17} = 187.3566$
$\quad d_{17} = 0.300$
$r_{18} = 24.6796$
$\quad d_{18} = 9.359 \quad n_{e18} = 1.72538 \quad \nu_{e18} = 34.47$
$r_{19} = 20.3802$
$\quad d_{19} = 1.377$
$r_{20} = 39.2697$
$\quad d_{20} = 2.000 \quad n_{e20} = 1.72538 \quad \nu_{e20} = 34.47$
$r_{21} = 16.0804$
$\quad d_{21} = D21$
$r_{22} = \infty$ (aperture stop)
$\quad d_{22} = 3.575$
$r_{23} = -30.0984$
$\quad d_{23} = 2.000 \quad n_{e23} = 1.61669 \quad \nu_{e23} = 44.02$
$r_{24} = 23.9795$
$\quad d_{24} = 8.757 \quad n_{e24} = 1.48915 \quad \nu_{e24} = 70.04$
$r_{25} = -18.9682$
$\quad d_{25} = 3.837$
$r_{26} = -14.1963$
$\quad d_{26} = 0.817 \quad n_{e26} = 1.61639 \quad \nu_{e26} = 44.15$
$r_{27} = 101.4717$
$\quad d_{27} = 4.565$
$r_{28} = 1012.5847$
$\quad d_{28} = 8.419 \quad n_{e28} = 1.43985 \quad \nu_{e28} = 94.53$
$r_{29} = -18.1103$
$\quad d_{29} = 0.629$
$r_{30} = 69.9749$
$\quad d_{30} = 4.880 \quad n_{e30} = 1.43985 \quad \nu_{e30} = 94.53$
$r_{31} = -123.8898$
$\quad d_{31} = 0.928$ -continued Numerical data 4

$r_{32} = 61.1846$
$\quad d_{32} = 4.997 \quad n_{e32} = 1.43985 \quad \nu_{e32} = 94.53$
$r_{33} = -136.6736$
$\quad d_{33} = D33$
$r_{34} = \infty$
$\quad d_{34} = 33.000 \quad n_{e34} = 1.61173 \quad \nu_{e34} = 46.30$
$r_{35} = \infty$
$\quad d_{35} = 13.200 \quad n_{e35} = 1.51825 \quad \nu_{e35} = 63.93$
$r_{36} = \infty$
$\quad d_{36} = 0.500$
$r_{37} = \infty$ (imaging surface)
$\quad d_{37} = 0.000$ Zoom data

| | 0.3× | 0.4× | 0.5× |
|---|---|---|---|
| D1 | 38.765 | 44.451 | 53.283 |
| D7 | 117.344 | 81.410 | 52.958 |
| D15 | 3.000 | 34.932 | 56.369 |
| D21 | 2.614 | 3.787 | 5.228 |
| D33 | 21.660 | 18.803 | 15.544 |

Parameters of conditions

| Magnification: β | 0.3× | 0.4× | 0.5× |
|---|---|---|---|
| Entrance pupil position: En | 1117.828 | 5171.585 | −1158.986 |
| Object-to-image distance: L | 432.125 | 432.125 | 432.125 |
| \|En\|/L | 2.587 | 11.968 | 2.682 |
| Exit pupil position: Ex | −357.630 | −357.630 | −357.630 |
| \|Ex\|/\|L/β\| | 0.248 | 0.331 | 0.485 |
| F-number: FNO | 3.500 | 3.479 | 3.414 |
| FNO fluctuation: ΔFNO | | −0.046 | |
| \|ΔFNO/Δβ\| | | −0.228 | |
| Object-side radius of curvature: R3f | | 40.130 | |
| Image-side radius of curvature: R3b | | 16.080 | |
| \|(R3f + R3b)/(R3f − R3b)\| | | 2.337 | |

Fifth Embodiment

FIGS. 9A, 9B, and 9C show optical arrangements, developed along the optical axis, at magnifications of 0.3×, 0.4×, and 0.5×, respectively, of the fifth embodiment of the imaging optical system according to the present invention. FIGS. 10A, 10B, and 10C show aberration characteristics in focusing at a magnification of 0.4× of the imaging optical system in the fifth embodiment.

The imaging optical system of the fifth embodiment has the variable magnification optical system Z.

The variable magnification optical system Z comprises, in order from the object side toward the image side, the first lens unit G1 with positive refractive power, the second lens unit G2 with positive refractive power, the third lens unit G3 with negative refractive power, the aperture stop S, and the fourth lens unit G4 with positive refractive power.

The first lens unit G1 includes, in order from the object side, a plano-convex lens $L1_1'$ with a convex surface directed toward the object side and a plane surface directed toward the image side, the negative meniscus lens $L1_2'$ with a convex surface directed toward the object side, and the positive meniscus lens $L1_3'$ with a convex surface directed toward the object side.

The second lens unit G2, in order from the object side, the negative meniscus lens $L2_1$ with a convex surface directed toward the object side, the biconvex lens $L2_2$, the negative meniscus lens $L2_3$ with a concave surface directed toward the object side, and the biconvex lens $L2_4$.

The third lens unit G3 includes the positive meniscus lens $L3_1$ with a convex surface directed toward the object side, the negative meniscus lens $L3_2$ with a convex surface directed toward the object side, and the negative meniscus lens $L3_3$ with a convex surface directed toward the object side.

The fourth lens unit G4 includes the cemented doublet of the biconcave lens $L4_1$ and the biconvex lens $L4_2$, the biconcave lens $L4_3$, the biconvex lens $L4_4$, the biconvex lens $L4_5$, and the biconvex lens $L4_6$.

When the magnification is changed from 0.3× to 0.5× in focusing of the infinite object point, the first lens unit G1, after being moved once toward the object side, is moved toward the image side, the second lens unit G2 is moved toward the object side, the third lens unit G3 is moved toward the object side so that the spacing between the third and fourth lens units G3 and G4 is slightly widened, and the fourth lens unit G4 remains fixed together with the stop S. Also, the object-to-image distance in the magnification change is kept constant.

Subsequently, numerical data of optical members constituting the imaging optical system of the fifth embodiment are shown below.

Numerical data 5

Image height: 5.783
$r_0 = \infty$ (object)
$d_0 = 50.000$
$r_1 = \infty$ (object surface)
$d_1 = D1$
$r_2 = 53.6678$
$d_2 = 7.850$  $n_{e2} = 1.48915$  $\nu_{e2} = 70.04$
$r_3 = \infty$
$d_3 = 0.300$
$r_4 = 74.4381$
$d_4 = 6.000$  $n_{e4} = 1.61639$  $\nu_{e4} = 44.15$
$r_5 = 34.5362$
$d_5 = 8.043$
$r_6 = 39.1043$
$d_6 = 4.857$  $n_{e6} = 1.43985$  $\nu_{e6} = 94.53$
$r_7 = 52.1576$
$d_7 = D7$
$r_8 = 149.0540$
$d_8 = 6.000$  $n_{e8} = 1.61639$  $\nu_{e8} = 44.15$
$r_9 = 50.6084$
$d_9 = 6.908$
$r_{10} = 78.4447$
$d_{10} = 9.096$  $n_{e10} = 1.43985$  $\nu_{e10} = 94.53$
$r_{11} = -67.1214$
$d_{11} = 1.239$
$r_{12} = -55.5198$
$d_{12} = 7.000$  $n_{e12} = 1.61639$  $\nu_{e12} = 44.15$
$r_{13} = -130.4767$
$d_{13} = 17.549$
$r_{14} = 526.4312$
$d_{14} = 10.495$  $n_{e14} = 1.43985$  $\nu_{e14} = 94.53$
$r_{15} = -60.7655$
$d_{15} = D15$
$r_{16} = 42.8799$
$d_{16} = 4.607$  $n_{e16} = 1.69417$  $\nu_{e16} = 30.83$
$r_{17} = 241.5957$
$d_{17} = 0.300$
$r_{18} = 24.0062$
$d_{18} = 9.266$  $n_{e18} = 1.72538$  $\nu_{e18} = 34.47$
$r_{19} = 20.0630$
$d_{19} = 1.423$
$r_{20} = 37.0493$
$d_{20} = 2.000$  $n_{e20} = 1.72538$  $\nu_{e20} = 34.47$ -continued Numerical data 5

$r_{21} = 16.8163$
$d_{21} = D21$
$r_{22} = \infty$ (aperture stop)
$d_{22} = 3.685$
$r_{23} = -27.7248$
$d_{23} = 2.000$  $n_{e23} = 1.61669$  $\nu_{e23} = 44.02$
$r_{24} = 25.1231$
$d_{24} = 5.991$  $n_{e24} = 1.48915$  $\nu_{e24} = 70.04$
$r_{25} = -18.8837$
$d_{25} = 4.943$
$r_{26} = -14.1386$
$d_{26} = 0.553$  $n_{e26} = 1.61639$  $\nu_{e26} = 44.15$
$r_{27} = 103.4372$
$d_{27} = 4.610$
$r_{28} = 946.2142$
$d_{28} = 8.426$  $n_{e28} = 1.43985$  $\nu_{e28} = 94.53$
$r_{29} = -18.1453$
$d_{29} = 0.300$
$r_{30} = 79.1515$
$d_{30} = 7.210$  $n_{e30} = 1.43985$  $\nu_{e30} = 94.53$
$r_{31} = -65.2376$
$d_{31} = 5.640$
$r_{32} = 63.0290$
$d_{32} = 6.581$  $n_{e32} = 1.43985$  $\nu_{e32} = 94.53$
$r_{33} = -291.4522$
$d_{33} = 19.405$
$r_{34} = \infty$
$d_{34} = 33.000$  $n_{e34} = 1.61173$  $\nu_{e34} = 46.30$
$r_{35} = \infty$
$d_{35} = 13.200$  $n_{e35} = 1.51825$  $\nu_{e35} = 63.93$
$r_{36} = \infty$
$d_{36} = 0.500$
$r_{37} = \infty$ (imaging surface)
$d_{37} = 0.000$ Zoom data

|  | 0.3× | 0.4× | 0.5× |
| --- | --- | --- | --- |
| D1 | 42.960 | 38.372 | 47.817 |
| D7 | 105.480 | 70.527 | 33.769 |
| D15 | 3.000 | 40.551 | 66.211 |
| D21 | 2.679 | 4.670 | 6.322 |

Parameters of conditions

| Magnification: β | 0.3× | 0.4× | 0.5× |
| --- | --- | --- | --- |
| Entrance pupil position: En | 1295.110 | 24846.034 | −1103.070 |
| Object-to-image distance: L | 423.096 | 423.096 | 423.096 |
| \|En\|/L | 3.061 | 58.724 | 2.607 |
| Exit pupil position: Ex | −366.274 | −366.274 | −366.274 |
| \|Ex\|/\|L/β\| | 0.260 | 0.346 | 0.433 |
| F-number: FNO | 3.500 | 3.500 | 3.500 |
| FNO fluctuation: ΔFNO |  | 0.000 |  |
| \|ΔFNO/Δβ\| |  | −0.002 |  |
| Object-side radius of curvature: R3f |  | 42.880 |  |
| Image-side radius of curvature: R3b |  | 16.816 |  |
| \|(R3f + R3b)/(R3f − R3b)\| |  | 2.290 |  |

Sixth Embodiment

Figure 11A:
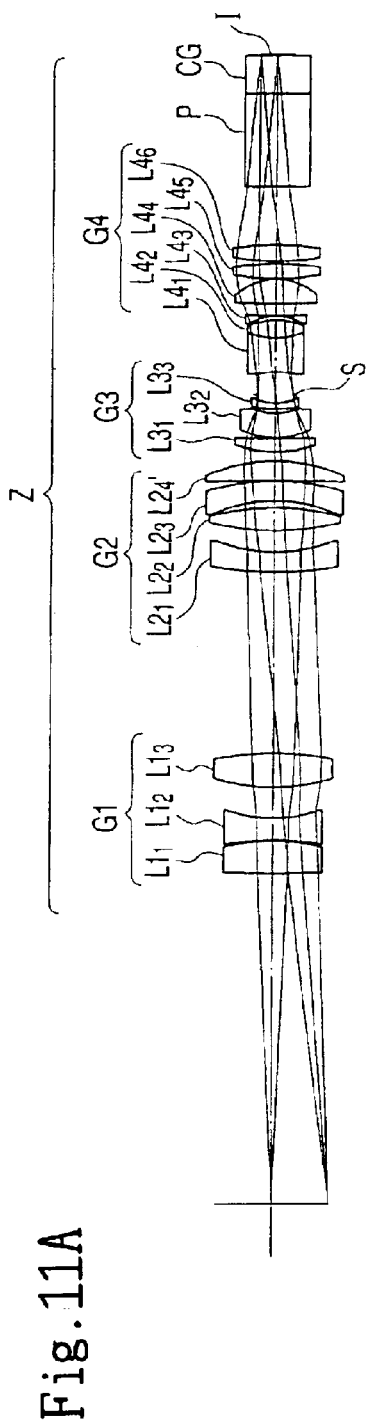
FIGS. 11A, 11B, and 11C are sectional views showing optical arrangements, developed along the optical axis, at magnifications of 0.3×, 0.4×, and 0.5×, respectively, of a sixth embodiment of the imaging optical system according to the present invention.
Figure 11B:
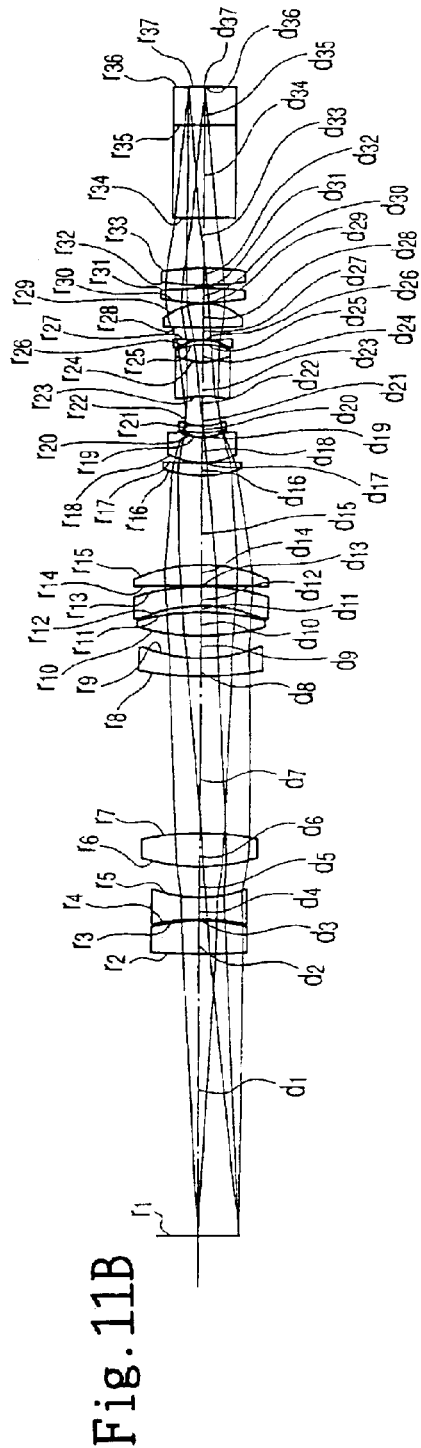
Figure 11C:
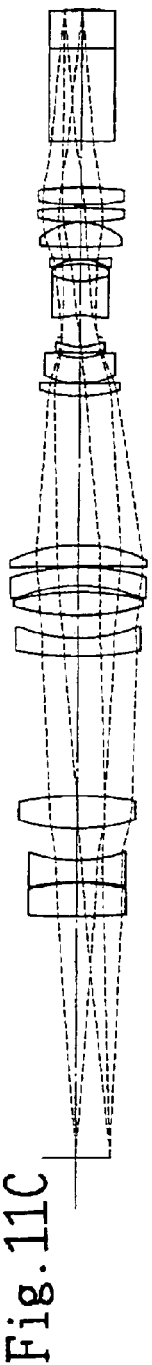

FIGS. 11A, 11B, and 11C show optical arrangements, developed along the optical axis, at magnifications of 0.3×, 0.4×, and 0.5×, respectively, of the sixth embodiment of the imaging optical system according to the present invention. FIGS. 12A, 12B, and 12C show aberration characteristics in focusing at a magnification of 0.4× of the imaging optical system in the sixth embodiment.

The imaging optical system of the sixth embodiment has the variable magnification optical system Z.

The variable magnification optical system Z comprises, in order from the object side toward the image side, the first lens unit G1 with positive refractive power, the second lens unit G2 with positive refractive power, the third lens unit G3 with negative refractive power, the aperture stop S, and the fourth lens unit G4 with positive refractive power.

The first lens unit G1 includes, in order from the object side, the biconvex lens $L1_1$, the biconcave lens $L1_2$, and the biconvex lens $L1_3$.

The second lens unit G2, in order from the object side, the negative meniscus lens $L2_1$ with a convex surface directed toward the object side, the biconvex lens $L2_2$, the negative meniscus lens $L2_3$ with a concave surface directed toward the object side, and a positive meniscus lens $L2_4'$ with a concave surface directed toward the object side.

The third lens unit G3 includes the positive meniscus lens $L3_1$ with a convex surface directed toward the object side, the negative meniscus lens $L3_2$ with a convex surface directed toward the object side, and the negative meniscus lens $L3_3$ with a convex surface directed toward the object side.

The fourth lens unit G4 includes the cemented doublet of the biconcave lens $L4_1$ and the biconvex lens $L4_2$, the biconcave lens $L4_3$, the biconvex lens $L4_4$, the biconvex lens $L4_5$, and the biconvex lens $L4_6$.

When the magnification is changed from 0.3× to 0.5× in focusing of the infinite object point, the first lens unit G1 is moved toward the object side, the second lens unit G2 is moved toward the object side so that spacing between the first and second lens units G1 and G2 is widened, the third lens unit G3 is moved together with the stop S toward the image side, and the fourth lens unit G4 is moved toward the image side so that the spacing between the third and fourth lens units G3 and G4 is slightly widened. Also, the object-to-image distance in the magnification change is kept constant.

Subsequently, numerical data of optical members constituting the imaging optical system of the sixth embodiment are shown below.

Numerical data 6

Image height: 5.783
$r_0 = \infty$ (object)
  $d_0 = 50.000$
$r_1 = \infty$ (object surface)
  $d_1 = D1$
$r_2 = 361.3250$
  $d_2 = 12.000$  $n_{e2} = 1.48915$  $\nu_{e2} = 70.04$
$r_3 = -65.3190$
  $d_3 = 0.300$
$r_4 = -90.3503$
  $d_4 = 8.000$  $n_{e4} = 1.61639$  $\nu_{e4} = 44.15$
$r_5 = 45.5593$
  $d_5 = 11.355$
$r_6 = 65.7955$
  $d_6 = 12.000$  $n_{e6} = 1.43985$  $\nu_{e6} = 94.53$
$r_7 = -101.4028$
  $d_7 = D7$
$r_8 = 113.0032$
  $d_8 = 7.000$  $n_{e8} = 1.61639$  $\nu_{e8} = 44.15$
$r_9 = 53.1618$
  $d_9 = 7.854$
$r_{10} = 84.6315$
  $d_{10} = 8.348$  $n_{e10} = 1.43985$  $\nu_{e10} = 94.53$ -continued Numerical data 6

$r_{11} = -82.9242$
  $d_{11} = 2.346$
$r_{12} = -51.6817$
  $d_{12} = 6.901$  $n_{e12} = 1.61639$  $\nu_{e12} = 44.15$
$r_{13} = -78.9538$
  $d_{13} = 0.300$
$r_{14} = -746.1406$
  $d_{14} = 7.363$  $n_{e14} = 1.43985$  $\nu_{e14} = 94.53$
$r_{15} = -54.9986$
  $d_{15} = D15$
$r_{16} = 40.2152$
  $d_{16} = 4.672$  $n_{e16} = 1.69417$  $\nu_{e16} = 30.83$
$r_{17} = 202.9669$
  $d_{17} = 0.300$
$r_{18} = 25.2156$
  $d_{18} = 9.337$  $n_{e18} = 1.72538$  $\nu_{e18} = 34.47$
$r_{19} = 20.5989$
  $d_{19} = 1.486$
$r_{20} = 47.2290$
  $d_{20} = 2.000$  $n_{e20} = 1.72538$  $\nu_{e20} = 34.47$
$r_{21} = 17.1952$
  $d_{21} = D21$
$r_{22} = \infty$ (aperture stop)
  $d_{22} = 8.090$
$r_{23} = -31.8155$
  $d_{23} = 12.000$  $n_{e23} = 1.61669$  $\nu_{e23} = 44.02$
$r_{24} = 23.4115$
  $d_{24} = 6.316$  $n_{e24} = 1.48915$  $\nu_{e24} = 70.04$
$r_{25} = -23.1015$
  $d_{25} = 1.525$
$r_{26} = -17.3296$
  $d_{26} = 0.137$  $n_{e26} = 1.61639$  $\nu_{e26} = 44.15$
$r_{27} = 121.5936$
  $d_{27} = 4.365$
$r_{28} = 236.9154$
  $d_{28} = 8.477$  $n_{e28} = 1.43985$  $\nu_{e28} = 94.53$
$r_{29} = -20.8758$
  $d_{29} = 0.300$
$r_{30} = 78.3373$
  $d_{30} = 5.274$  $n_{e30} = 1.43985$  $\nu_{e30} = 94.53$
$r_{31} = -103.6059$
  $d_{31} = 0.983$
$r_{32} = 81.5041$
  $d_{32} = 5.879$  $n_{e32} = 1.43985$  $\nu_{e32} = 94.53$
$r_{33} = -103.9512$
  $d_{33} = D33$
$r_{34} = \infty$
  $d_{34} = 33.000$  $n_{e34} = 1.61173$  $\nu_{e34} = 46.30$
$r_{35} = \infty$
  $d_{35} = 13.200$  $n_{e35} = 1.51825$  $\nu_{e35} = 63.93$
$r_{36} = \infty$
  $d_{36} = 0.500$
$r_{37} = \infty$ (imaging surface)
  $d_{37} = 0.000$ Zoom data

|     | 0.3×   | 0.4×   | 0.5×   |
| --- | ------ | ------ | ------ |
| D1  | 68.668 | 51.352 | 36.703 |
| D7  | 65.281 | 56.350 | 50.311 |
| D15 | 3.000  | 32.024 | 53.396 |
| D21 | 2.770  | 2.825  | 3.398  |
| D33 | 20.686 | 17.854 | 16.597 |

| Parameters of conditions | | | |
|---|---|---|---|
| Magnification: β | 0.3× | 0.4× | 0.5× |
| Entrance pupil position: En | 140.733 | 198.229 | 329.610 |
| Object-to-image distance: L | 412.012 | 412.012 | 412.012 |
| \|En\|/L | 0.342 | 0.481 | 0.800 |
| Exit pupil position: Ex | 2022.944 | 2022.944 | 2022.944 |
| \|Ex\|/\|L/β\| | 1.473 | 1.964 | 2.455 |
| F-number: FNO | 3.500 | 3.511 | 3.516 |
| FNO fluctuation: ΔFNO | | 0.016 | |
| \|ΔFNO/Δβ\| | | 0.082 | |
| Object-side radius of curvature: R3f | | 40.215 | |
| Image-side radius of curvature: R3b | | 17.195 | |
| \|(R3f + R3b)/(R3f − R3b)\| | | 2.494 | |

Seventh Embodiment

Figure 13A:
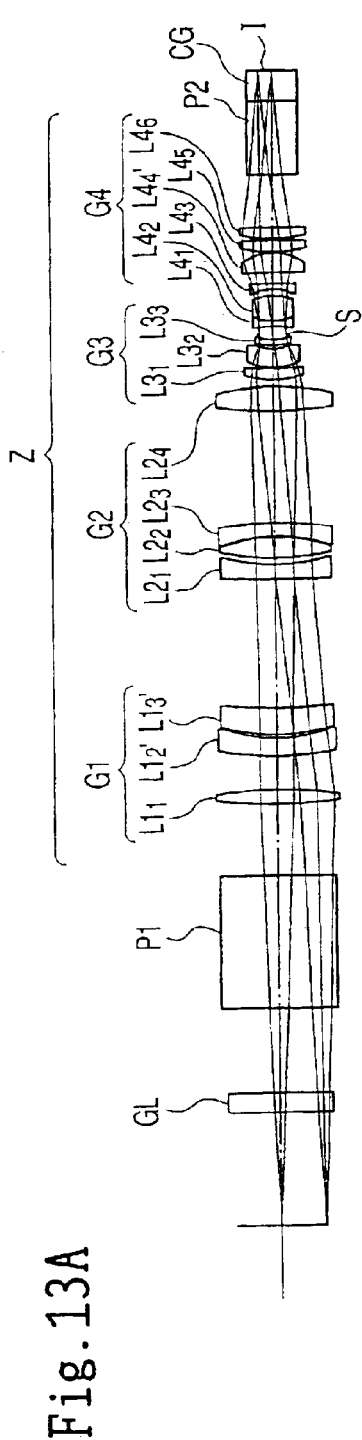
FIGS. 13A, 13B, and 13C are sectional views showing optical arrangements, developed along the optical axis, at magnifications of 0.3×, 0.4×, and 0.5×, respectively, of a seventh embodiment of the imaging optical system according to the present invention.
Figure 13B:
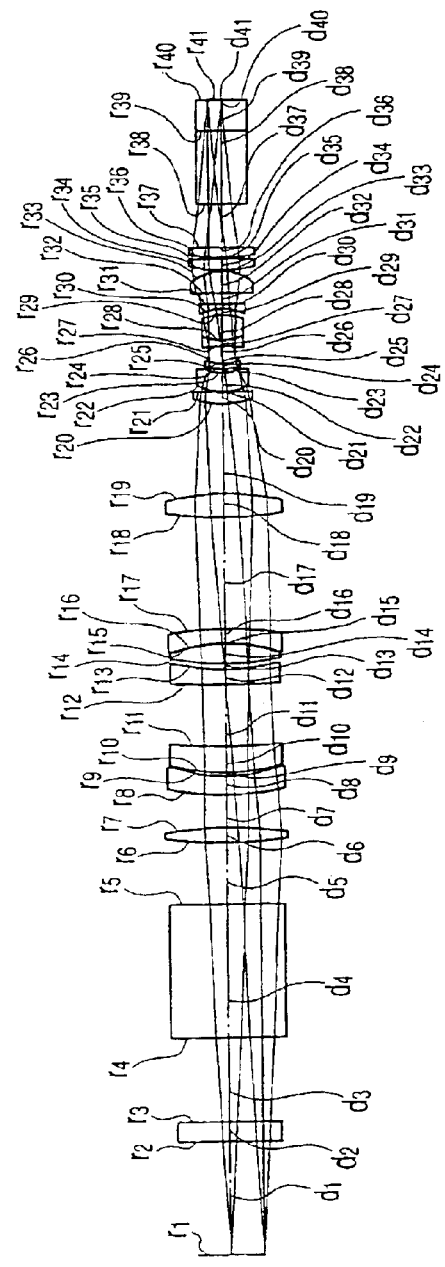
Figure 13C:
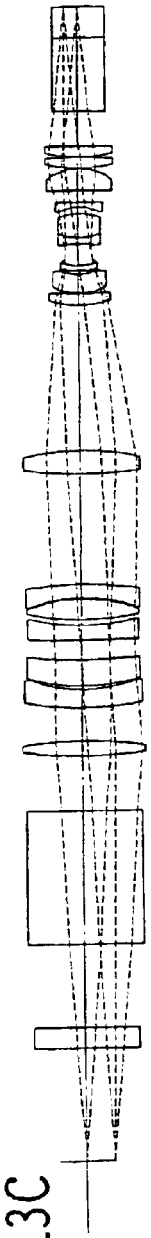

FIGS. 13A, 13B, and 13C show optical arrangements, developed along the optical axis, at magnifications of 0.3×, 0.4×, and 0.5×, respectively, of the seventh embodiment of the imaging optical system according to the present invention. FIGS. 14A, 14B, and 14C show aberration characteristics in focusing at a magnification of 0.4× of the imaging optical system in the seventh embodiment.

The imaging optical system of the seventh embodiment has the variable magnification optical system Z. In FIG. 13A, reference symbol GL designates a plane-parallel plate and P1 and P2 designate prisms.

The variable magnification optical system Z comprises, in order from the object side toward the image side, the first lens unit G1 with positive refractive power, the second lens unit G2 with positive refractive power, the third lens unit G3 with negative refractive power, the aperture stop S, and the fourth lens unit G4 with positive refractive power.

The first lens unit G1 includes, in order from the object side, the biconvex lens $L1_1$, the negative meniscus lens $L1_2'$ with a convex surface directed toward the object side, and the positive meniscus lens $L1_3'$ with a convex surface directed toward the object side.

The second lens unit G2, in order from the object side, the negative meniscus lens $L2_1$ with a convex surface directed toward the object side, the biconvex lens $L2_2$, the negative meniscus lens $L2_3$ with a concave surface directed toward the object side, and the biconvex lens $L2_4$.

The third lens unit G3 includes the positive meniscus lens $L3_1$ with a convex surface directed toward the object side, the negative meniscus lens $L3_2$ with a convex surface directed toward the object side, and the negative meniscus lens $L3_3$ with a convex surface directed toward the object side.

The fourth lens unit G4 includes the cemented doublet of the biconcave lens $L4_1$ and the biconvex lens $L4_2$, the biconcave lens $L4_3$, a positive meniscus lens $L4_4'$ with a concave surface directed toward the object side, the biconvex lens $L4_5$, and the biconvex lens $L4_6$.

When the magnification is changed from 0.3× to 0.5× in focusing of the infinite object point, the first lens unit G1 is moved toward the object side, the second lens unit G2 is moved toward the object side so that the spacing between the first and second lens units G1 and G2 is narrowed, the third lens unit G3 is moved together with the stop S toward the image side, and the fourth lens unit G4 is moved toward the image side so that the spacing between the third and fourth lens units G3 and G4 is slightly widened. Also, the object-to-image distance in the magnification change is kept constant.

Subsequently, numerical data of optical members constituting the imaging optical system of the seventh embodiment are shown below.

Numerical data 7
Image height: 5.783

$r_0 = \infty$ (object)
  $d_0 = 51.000$
$r_1 = \infty$ (object surface)
  $d_1 = 9.260$  $n_{e1} = 1.51825$  $\nu_{e1} = 63.93$
$r_2 = \infty$
  $d_2 = 2.740$
$r_3 = \infty$
  $d_3 = 35.000$
$r_4 = \infty$
  $d_4 = 60.000$  $n_{e4} = 1.51825$  $\nu_{e4} = 63.93$
$r_5 = \infty$
  $d_5 = D5$
$r_6 = 206.3131$
  $d_6 = 6.508$  $n_{e6} = 1.48915$  $\nu_{e6} = 70.04$
$r_7 = -156.0897$
  $d_7 = 15.114$
$r_8 = 130.1657$
  $d_8 = 8.000$  $n_{e8} = 1.61639$  $\nu_{e8} = 44.15$
$r_9 = 61.3830$
  $d_9 = 1.693$
$r_{10} = 80.8720$
  $d_{10} = 12.000$  $n_{e10} = 1.43985$  $\nu_{e10} = 94.53$
$r_{11} = 232.8980$
  $d_{11} = D11$
$r_{12} = 672.7620$
  $d_{12} = 6.836$  $n_{e12} = 1.61639$  $\nu_{e12} = 44.15$
$r_{13} = 82.8549$
  $d_{13} = 2.818$
$r_{14} = 110.5678$
  $d_{14} = 9.282$  $n_{e14} = 1.43985$  $\nu_{e14} = 94.53$
$r_{15} = -65.4332$
  $d_{15} = 0.300$
$r_{16} = -67.0268$
  $d_{16} = 6.107$  $n_{e16} = 1.61639$  $\nu_{e16} = 44.15$
$r_{17} = -156.9702$
  $d_{17} = 50.171$
$r_{18} = 160.2358$
  $d_{18} = 10.874$  $n_{e18} = 1.43985$  $\nu_{e18} = 94.53$
$r_{19} = -98.7058$
  $d_{19} = D19$
$r_{20} = 37.4259$
  $d_{20} = 5.034$  $n_{e20} = 1.69417$  $\nu_{e20} = 30.83$
$r_{21} = 212.9113$
  $d_{21} = 0.300$
$r_{22} = 22.9775$
  $d_{22} = 8.363$  $n_{e22} = 1.72538$  $\nu_{e22} = 34.47$
$r_{23} = 18.2286$
  $d_{23} = 1.827$
$r_{24} = 101.2051$
  $d_{24} = 2.247$  $n_{e24} = 1.72538$  $\nu_{e24} = 34.47$
$r_{25} = 17.6992$
  $d_{25} = 2.554$
$r_{26} = \infty$ (aperture stop)
  $d_{26} = D26$
$r_{27} = -55.3149$
  $d_{27} = 2.589$  $n_{e27} = 1.61669$  $\nu_{e27} = 44.02$
$r_{28} = 20.3875$
  $d_{28} = 11.136$  $n_{e28} = 1.48915$  $\nu_{e28} = 70.04$
$r_{29} = -22.7793$
  $d_{29} = 2.967$
$r_{30} = -17.4070$
  $d_{30} = 2.255$  $n_{e30} = 1.61639$  $\nu_{e30} = 44.15$
$r_{31} = 660.0000$
  $d_{31} = 5.164$
$r_{32} = -361.4116$
  $d_{32} = 9.280$  $n_{e32} = 1.43985$  $\nu_{e32} = 94.53$
$r_{33} = -21.6618$
  $d_{33} = 0.300$
$r_{34} = 57.4166$
  $d_{34} = 5.104$  $n_{e34} = 1.43985$  $\nu_{e34} = 94.53$
$r_{35} = -177.5066$
  $d_{35} = 0.350$ -continued Numerical data 7
Image height: 5.783

$r_{36} = 61.7155$
$\quad d_{36} = 4.849 \quad n_{e36} = 1.43985 \quad \nu_{e36} = 94.53$
$r_{37} = -672.7620$
$\quad d_{37} = D37$
$r_{38} = \infty$
$\quad d_{38} = 33.000 \quad n_{e38} = 1.61173 \quad \nu_{e38} = 46.30$
$r_{39} = \infty$
$\quad d_{39} = 13.200 \quad n_{e39} = 1.51825 \quad \nu_{e39} = 63.93$
$r_{40} = \infty$
$\quad d_{40} = 0.500$
$r_{41} = \infty$ (imaging surface)
$\quad d_{41} = 0.000$ Zoom data

|     | 0.3x   | 0.4x   | 0.5x   |
| --- | ------ | ------ | ------ |
| D5  | 32.142 | 28.009 | 24.962 |
| D11 | 58.194 | 27.683 | 8.473  |
| D19 | 3.000  | 39.963 | 64.634 |
| D26 | 3.340  | 5.440  | 7.048  |
| D37 | 23.777 | 19.357 | 15.336 |

Parameters of conditions

| | Magnification β: | | |
| --- | --- | --- | --- |
| | 0.3x | 0.4x | 0.5x |
| Entrance pupil position: En | 1215.330 | 17052.978 | −1195.682 |
| Object-to-image distance: L | 467.675 | 467.675 | 467.675 |
| \|En\|/L | 2.599 | 36.463 | 2.557 |
| Exit pupil position: Ex | −361.027 | −890.944 | −13016.681 |
| \|Ex\|/L/β\| | 0.232 | 0.762 | 13.916 |
| F-number: FNO | 3.500 | 3.517 | 3.556 |
| FNO fluctuation: ΔFNO | | 0.056 | |
| \|ΔFNO/Δβ\| | | 0.280 | |
| Object-side radius of curvature: R3f | | 37.426 | |
| Image-side radius of curvature: R3b | | 17.699 | |
| \|(R3f + R3b)/(R3f − R3b)\| | | 2.794 | |

Eighth Embodiment

FIGS. 15A, 15B, and 15C show optical arrangements, developed along the optical axis, at magnifications of 0.3×, 0.4×, and 0.5×, respectively, of the eighth embodiment of the imaging optical system according to the present invention. FIGS. 16A, 16B, and 16C show aberration characteristics in focusing at a magnification of 0.4× of the imaging optical system in the eighth embodiment. The imaging optical system of the eighth embodiment has the variable magnification optical system Z.

The variable magnification optical system Z comprises, in order from the object side toward the image side, the first lens unit G1 with positive refractive power, the second lens unit G2 with positive refractive power, the third lens unit G3 with negative refractive power, the aperture stop S, and the fourth lens unit G4 with positive refractive power.

The first lens unit G1 includes, in order from the object side, a positive meniscus lens $L1_1$" with a concave surface directed toward the object side, the negative meniscus lens $L1_2$' with a concave surface directed toward the object side, and the biconvex lens $L1_3$.

The second lens unit G2, in order from the object side, the negative meniscus lens $L2_1$ with a convex surface directed toward the object side, the biconvex lens $L2_2$, the negative meniscus lens $L2_3$ with a concave surface directed toward the object side, the positive meniscus lens $L2_4$' with a concave surface directed toward the object side, and a positive meniscus lens $L2_5$ with a convex surface directed toward the object side.

The third lens unit G3 includes a biconvex lens $L3_1$', the negative meniscus lens $L3_2$ with a convex surface directed toward the object side, and the negative meniscus lens $L3_3$ with a convex surface directed toward the object side.

The fourth lens unit G4 includes a negative meniscus lens $L4_1$' with a convex surface directed toward the object side, a positive meniscus lens $L4_2$' with a concave surface directed toward the object side, a negative meniscus lens $L4_3$' with a concave surface directed toward the object side, the positive meniscus lens $L4_4$' with a concave surface directed toward the object side, the biconvex lens $L4_5$, and a positive meniscus lens $L4_6$' with a convex surface directed toward the object side. When the magnification is changed from 0.3× to 0.5× in focusing of the infinite object point, the first lens unit G1 is moved toward the object side, the second lens unit G2 is moved toward the object side so that the spacing between the first and second lens units G1 and G2 is widened, the third lens unit G3 is moved together with the stop S toward the object side so that the spacing between the second and third lens units G2 and G3 is slightly widened, and the fourth lens unit G4, after being slightly moved once toward the image side, is slightly moved toward the object side. Also, the object-to-image distance in the magnification change is kept constant.

Subsequently, numerical data of optical members constituting the imaging optical system of the eighth embodiment are shown below.

Numerical data 8
Image height: 5.783

$r_0 = \infty$ (object)
$\quad d_0 = 51.000$
$r_1 = \infty$ (object surface)
$\quad d_1 = 9.260 \quad n_{e1} = 1.51825 \quad \nu_{e1} = 63.93$
$r_2 = \infty$
$\quad d_2 = 2.740$
$r_3 = \infty$
$\quad d_3 = 35.000$
$r_4 = \infty$
$\quad d_4 = 60.000 \quad n_{e4} = 1.51825 \quad \nu_{e4} = 63.93$
$r_5 = \infty$
$\quad d_5 = D5$
$r_6 = -218.393$
$\quad d_6 = 11.966 \quad n_{e6} = 1.48915 \quad \nu_{e6} = 70.04$
$r_7 = -59.981$
$\quad d_7 = 0.724$
$r_8 = -58.074$
$\quad d_8 = 8.000 \quad n_{e8} = 1.61639 \quad \nu_{e8} = 44.15$
$r_9 = -192.015$
$\quad d_9 = 0.300$
$r_{10} = 453.258$
$\quad d_{10} = 11.399 \quad n_{e10} = 1.43985 \quad \nu_{e10} = 94.53$
$r_{11} = -95.008$
$\quad d_{11} = D11$
$r_{12} = 111.240$
$\quad d_{12} = 6.982 \quad n_{e12} = 1.61639 \quad \nu_{e12} = 44.15$
$r_{13} = 49.021$
$\quad d_{13} = 0.808$
$r_{14} = 52.125$
$\quad d_{14} = 6.307 \quad n_{e14} = 1.43985 \quad \nu_{e14} = 94.53$
$r_{15} = -602.409$
$\quad d_{15} = 3.345$ -continued Numerical data 8
Image height: 5.783

| | | | |
|---|---|---|---|
| $r_{16} = -51.702$ | | | |
| | $d_{16} = 7.000$ | $n_{e16} = 1.61639$ | $v_{e16} = 44.15$ |
| $r_{17} = -123.131$ | | | |
| | $d_{17} = 0.300$ | | |
| $r_{18} = -267.367$ | | | |
| | $d_{18} = 5.244$ | $n_{e18} = 1.43985$ | $v_{e18} = 94.53$ |
| $r_{19} = -59.230$ | | | |
| | $d_{19} = 0.300$ | | |
| $r_{20} = 62.890$ | | | |
| | $d_{20} = 5.562$ | $n_{e20} = 1.43985$ | $v_{e20} = 94.53$ |
| $r_{21} = 208.855$ | | | |
| | $d_{21} = D21$ | | |
| $r_{22} = 109.670$ | | | |
| | $d_{22} = 4.560$ | $n_{e22} = 1.67765$ | $v_{e22} = 31.84$ |
| $r_{23} = -261.555$ | | | |
| | $d_{23} = 4.236$ | | |
| $r_{24} = 27.656$ | | | |
| | $d_{24} = 9.660$ | $n_{e24} = 1.83945$ | $v_{e24} = 42.47$ |
| $r_{25} = 22.416$ | | | |
| | $d_{25} = 3.719$ | | |
| $r_{26} = 591.785$ | | | |
| | $d_{26} = 2.000$ | $n_{e26} = 1.83945$ | $v_{e26} = 42.47$ |
| $r_{27} = 32.027$ | | | |
| | $d_{27} = 2.504$ | | |
| $r_{28} = \infty$ (aperture stop) | | | |
| | $d_{28} = D28$ | | |
| $r_{29} = 235.972$ | | | |
| | $d_{29} = 3.058$ | $n_{e29} = 1.61639$ | $v_{e29} = 44.15$ |
| $r_{30} = 39.062$ | | | |
| | $d_{30} = 3.236$ | | |
| $r_{31} = -23.495$ | | | |
| | $d_{31} = 6.117$ | $n_{e31} = 1.43985$ | $v_{e31} = 94.53$ |
| $r_{32} = -17.821$ | | | |
| | $d_{32} = 0.300$ | | |
| $r_{33} = -18.080$ | | | |
| | $d_{33} = 4.802$ | $n_{e33} = 1.61639$ | $v_{e33} = 44.15$ |
| $r_{34} = -31.126$ | | | |
| | $d_{34} = 0.300$ | | |
| $r_{35} = -67.557$ | | | |
| | $d_{35} = 4.329$ | $n_{e35} = 1.43985$ | $v_{e35} = 94.53$ |
| $r_{36} = -32.513$ | | | |
| | $d_{36} = 0.300$ | | |
| $r_{37} = 81.623$ | | | |
| | $d_{37} = 4.159$ | $n_{e37} = 1.43985$ | $v_{e37} = 94.53$ |
| $r_{38} = -357.038$ | | | |
| | $d_{38} = 0.484$ | | |
| $r_{39} = 34.763$ | | | |
| | $d_{39} = 5.000$ | $n_{e39} = 1.43985$ | $v_{e39} = 94.53$ |
| $r_{40} = 244.020$ | | | |
| | $d_{40} = D40$ | | |
| $r_{41} = \infty$ | | | |
| | $d_{41} = 33.000$ | $n_{e41} = 1.61173$ | $v_{e41} = 46.30$ |
| $r_{42} = \infty$ | | | |
| | $d_{42} = 13.200$ | $n_{e42} = 1.51825$ | $v_{e42} = 63.93$ |
| $r_{43} = \infty$ | | | |
| | $d_{43} = 0.500$ | | |
| $r_{44} = \infty$ (imaging surface) | | | |
| | $d_{44} = 0$ | | |

Zoom data

| | 0.3x | 0.4x | 0.5x |
|---|---|---|---|
| D5 | 193.324 | 142.895 | 90.403 |
| D11 | 3.000 | 43.660 | 80.930 |
| D21 | 3.160 | 6.077 | 8.978 |
| D28 | 20.516 | 27.628 | 34.649 |
| D40 | 11.289 | 11.032 | 16.330 |

Parameters of conditions

| | Magnification β: | | |
|---|---|---|---|
| | 0.3x | 0.4x | 0.5x |
| Entrance pupil position: En | 89.768 | 209.179 | 450.391 |
| Object-to-image distance: L | 562.991 | 562.991 | 562.991 |
| \|En\|/L | 0.159 | 0.372 | 0.800 |
| Exit pupil position: Ex | −355.985 | −5834.634 | 634.502 |
| \|Ex\|/\|L/β\| | 0.190 | 4.145 | 0.564 |
| F-number: FNO | 3.500 | 3.789 | 4.037 |
| FNO fluctuation: ΔFNO | | 0.537 | |
| \|ΔFNO/Δβ\| | | 2.685 | |
| Object-side radius of curvature: R3f | | 109.670 | |
| Image-side radius of curvature: R3b | | 32.027 | |
| \|(R3f + R3b)/(R3f − R3b)\| | | 1.825 | |

Ninth Embodiment

Figures 17A, 17B, 17C:
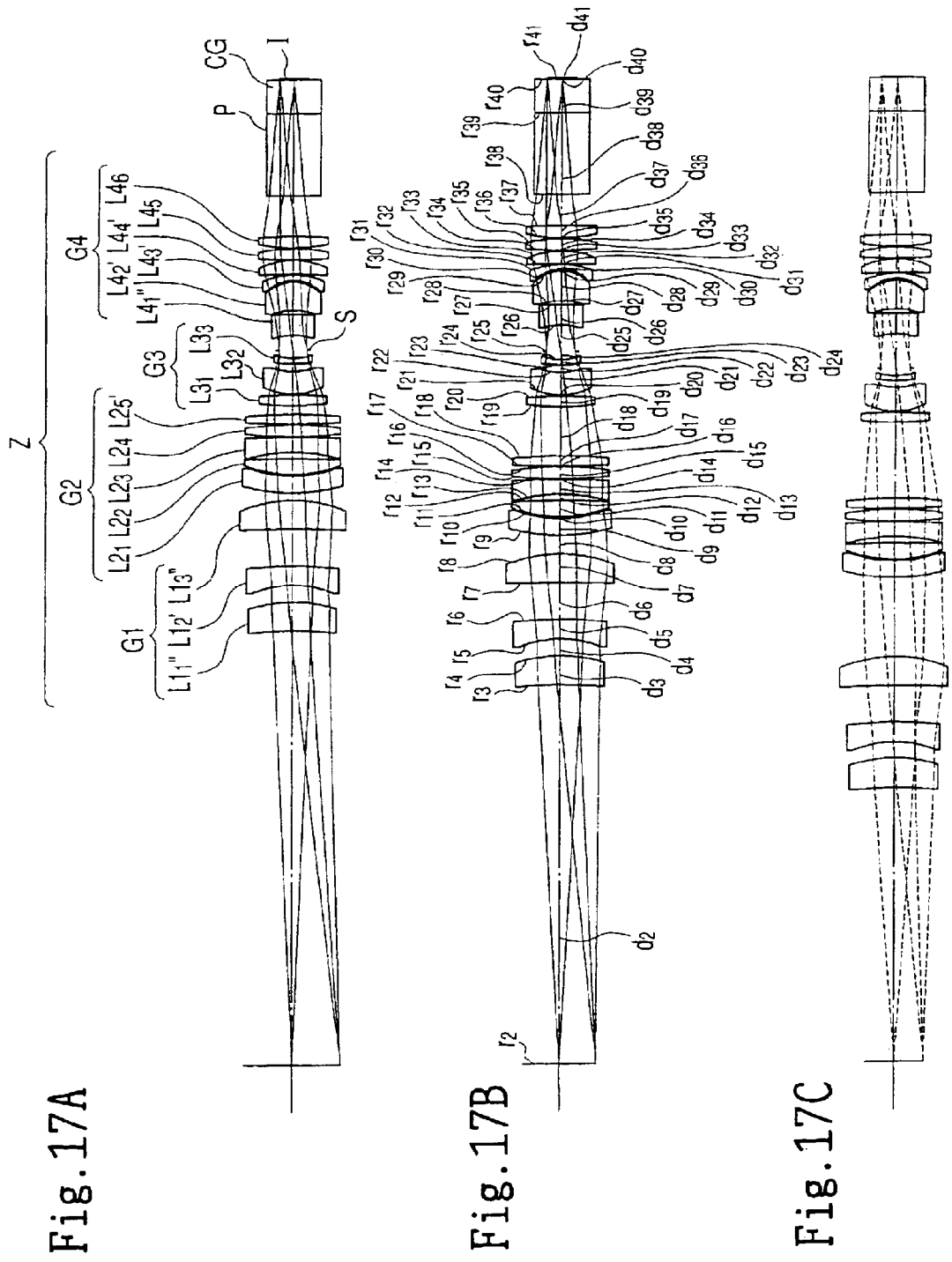
FIGS. 17A, 17B, and 17C are sectional views showing optical arrangements, developed along the optical axis, at magnifications of 0.3×, 0.4×, and 0.5×, respectively, of a ninth embodiment of the imaging optical system according to the present invention.

FIGS. 17A, 17B, and 17C show optical arrangements, developed along the optical axis, at magnifications of 0.3×, 0.4×, and 0.5×, respectively, of the ninth embodiment of the imaging optical system according to the present invention. FIGS. 18A, 18B, and 18C show aberration characteristics in focusing at a magnification of 0.4× of the imaging optical system in the ninth embodiment.

The imaging optical system of the ninth embodiment has the variable magnification optical system Z.

The variable magnification optical system Z comprises, in order from the object side toward the image side, the first lens unit G1 with positive refractive power, the second lens unit G2 with positive refractive power, the third lens unit G3 with negative refractive power, the aperture stop S, and the fourth lens unit G4 with positive refractive power.

The first lens unit G1 includes, in order from the object side, the positive meniscus lens $L1_1"$ with a concave surface directed toward the object side, the negative meniscus lens $L1_2'$ with a concave surface directed toward the object side, and a positive meniscus lens $L1_3"$ with a concave surface directed toward the object side.

The second lens unit G2, in order from the object side, the negative meniscus lens $L2_1$ with a convex surface directed toward the object side, the biconvex lens $L2_2$, the negative meniscus lens $L2_3$ with a concave surface directed toward the object side, the biconvex lens $L2_4$, and a biconvex lens $L2_5'$.

The third lens unit G3 includes the biconvex lens $L3_1$, the negative meniscus lens $L3_2$ with a convex surface directed toward the object side, and the negative meniscus lens $L3_3$ with a convex surface directed toward the object side.

The fourth lens unit G4 includes a negative meniscus lens $L4_4"$ with a concave surface directed toward the object side, the positive meniscus lens $L4_2'$ with a concave surface directed toward the object side, the negative meniscus lens $L4_3'$ with a concave surface directed toward the object side, the positive meniscus lens $L4_4'$ with a concave surface directed toward the object side, the biconvex lens $L4_5$, and the biconvex lens $L4_6$.

When the magnification is changed from 0.3× to 0.5× in focusing of the infinite object point, the first lens unit G1 is moved toward the object side, the second lens unit G2 is moved toward the object side so that the spacing between the first and second lens units G1 and G2 is widened, the third lens unit G3 is moved together with the stop S toward the object side so that the spacing between the second and third lens units G2 and G3 is widened, and the fourth lens unit G4, after being slightly moved once toward the image side, is slightly moved toward the object side. Also, the object-to-image distance in the magnification change is kept constant.

Subsequently, numerical data of optical members constituting the imaging optical system of the ninth embodiment are shown below.

Numerical data 9
Image height: 5.783

| | |
|---|---|
| $r_0 = \infty$ (object) | |
| | $d_0 = 21.000$ |
| $r_1 = \infty$ (object) | |
| | $d_1 = 26.161$ |
| $r_2 = \infty$ (object surface) | |
| | $d_2 = D2$ |
| $r_3 = -153.3010$ | |
| | $d_3 = 12.000$   $n_{e3} = 1.48915$   $\nu_{e3} = 70.04$ |
| $r_4 = -56.0044$ | |
| | $d_4 = 6.782$ |
| $r_5 = -42.5771$ | |
| | $d_5 = 8.000$   $n_{e5} = 1.61639$   $\nu_{e5} = 44.15$ |
| $r_6 = -173.4981$ | |
| | $d_6 = 15.255$ |
| $r_7 = -454.5776$ | |
| | $d_7 = 12.000$   $n_{e7} = 1.43985$   $\nu_{e7} = 94.53$ |
| $r_8 = -54.2450$ | |
| | $d_8 = D8$ |
| $r_9 = 74.1238$ | |
| | $d_9 = 7.000$   $n_{e9} = 1.61639$   $\nu_{e9} = 44.15$ |
| $r_{10} = 47.9620$ | |
| | $d_{10} = 0.782$ |
| $r_{11} = 50.6461$ | |
| | $d_{11} = 6.639$   $n_{e11} = 1.43985$   $\nu_{e11} = 94.53$ |
| $r_{12} = -395.4325$ | |
| | $d_{12} = 2.526$ |
| $r_{13} = -67.4730$ | |
| | $d_{13} = 6.000$   $n_{e13} = 1.61639$   $\nu_{e13} = 44.15$ |
| $r_{14} = -489.0704$ | |
| | $d_{14} = 0.300$ |
| $r_{15} = 162.7339$ | |
| | $d_{15} = 5.252$   $n_{e15} = 1.43985$   $\nu_{e15} = 94.53$ |
| $r_{16} = -122.6735$ | |
| | $d_{16} = 0.300$ |
| $r_{17} = 377.7299$ | |
| | $d_{17} = 4.142$   $n_{e17} = 1.43985$   $\nu_{e17} = 94.53$ |
| $r_{18} = -202.1041$ | |
| | $d_{18} = D18$ |
| $r_{19} = 108.3047$ | |
| | $d_{19} = 4.106$   $n_{e19} = 1.67765$   $\nu_{e19} = 31.84$ |
| $r_{20} = -192.0405$ | |
| | $d_{20} = 0.454$ |
| $r_{21} = 25.9085$ | |
| | $d_{21} = 9.623$   $n_{e21} = 1.83945$   $\nu_{e21} = 42.47$ |
| $r_{22} = 24.8614$ | |
| | $d_{22} = 2.939$ |
| $r_{23} = 50.8391$ | |
| | $d_{23} = 2.000$   $n_{e23} = 1.83945$   $\nu_{e23} = 42.47$ |
| $r_{24} = 18.5107$ | |
| | $d_{24} = 3.223$ |
| $r_{25} = \infty$ (aperture stop) | |
| | $d_{25} = D25$ |
| $r_{26} = -23.8975$ | |
| | $d_{26} = 8.198$   $n_{e26} = 1.61639$   $\nu_{e26} = 44.15$ |
| $r_{27} = -142.2318$ | |
| | $d_{27} = 1.569$ |
| $r_{28} = -27.6769$ | |
| | $d_{28} = 12.000$   $n_{e28} = 1.43985$   $\nu_{e28} = 94.53$ |
| $r_{29} = -15.4629$ | |
| | $d_{29} = 0.617$ |
| $r_{30} = -15.4255$ | |
| | $d_{30} = 2.000$   $n_{e30} = 1.61639$   $\nu_{e30} = 44.15$ |
| $r_{31} = -31.9175$ | |
| | $d_{31} = 0.300$ |
| $r_{32} = -193.4359$ | |
| | $d_{32} = 5.561$   $n_{e32} = 1.43985$   $\nu_{e32} = 94.53$ |
| $r_{33} = -30.6965$ | |
| | $d_{33} = 0.300$ |

-continued

Numerical data 9
Image height: 5.783

| | |
|---|---|
| $r_{34} = 190.3831$ | |
| | $d_{34} = 4.818$   $n_{e34} = 1.43985$   $\nu_{e34} = 94.53$ |
| $r_{35} = -61.6979$ | |
| | $d_{35} = 0.300$ |
| $r_{36} = 63.1906$ | |
| | $d_{36} = 4.652$   $n_{e36} = 1.43985$   $\nu_{e36} = 94.53$ |
| $r_{37} = -264.7349$ | |
| | $d_{37} = D37$ |
| $r_{38} = \infty$ | |
| | $d_{38} = 33.000$   $n_{e38} = 1.61173$   $\nu_{e38} = 46.30$ |
| $r_{39} = \infty$ | |
| | $d_{39} = 13.200$   $n_{e39} = 1.51825$   $\nu_{e39} = 63.93$ |
| $r_{40} = \infty$ | |
| | $d_{40} = 0.500$ |
| $r_{41} = \infty$ (imaging surface) | |
| | $d_{41} = 0.000$ |

Zoom data

| | 0.3x | 0.4x | 0.5x |
|---|---|---|---|
| D2 | 131.948 | 109.433 | 66.283 |
| D8 | 3.000 | 7.576 | 32.565 |
| D18 | 3.338 | 20.375 | 31.678 |
| D25 | 6.470 | 11.057 | 13.774 |
| D37 | 16.892 | 13.207 | 17.349 |

Parameters of conditions

| | Magnification $\beta$: | | |
|---|---|---|---|
| | 0.3x | 0.4x | 0.5x |
| Entrance pupil position: En | 104.859 | 165.265 | 302.380 |
| Object-to-image distance: L | 405.147 | 405.147 | 405.147 |
| $|En|/L$ | 0.259 | 0.408 | 0.746 |
| Exit pupil position: Ex | −368.020 | 2564.601 | 598.424 |
| $|Ex|/|L/\beta|$ | 0.273 | 2.532 | 0.739 |
| F-number: FNO | 3.500 | 3.725 | 3.839 |
| FNO fluctuation: $\Delta$FNO | | 0.339 | |
| $|\Delta FNO/\Delta\beta|$ | | 1.693 | |
| Object-side radius of curvature: R3f | | 108.305 | |
| Image-side radius of curvature: R3b | | 18.511 | |
| $|(R3f + R3b)/(R3f - R3b)|$ | | 1.412 | |

Subsequently, parameter values of the conditions in the above embodiments and whether the arrangements of the embodiments satisfy the requirements of the present invention are summarized in Tables 1 through 3.

TABLE 1

| | First embodiment | Second embodiment | Third embodiment |
|---|---|---|---|
| Object-side tele-centricity $|En|/L$ ($\beta = 0.3$) | 2.71 | 2.62 | 2.96 |
| Object-side tele-centricity $|En|/L$ ($\beta = 0.4$) | 47.27 | 38.41 | 42.84 |
| Object-side tele-centricity $|En|/L$ ($\beta = 0.5$) | 2.65 | 2.66 | 2.55 |

TABLE 1-continued

|  | First embodiment | Second embodiment | Third embodiment |
|---|---|---|---|
| Image-side telecentricity $|En|/|L/\beta|$ ($\beta = 0.3$) | 0.25 | 0.25 | 0.25 |
| Image-side telecentricity $|En|/|L/\beta|$ ($\beta = 0.4$) | 0.54 | 0.69 | 0.84 |
| Image-side telecentricity $|En|/|L/\beta|$ ($\beta = 0.5$) | 2.12 | 28.49 | 5.62 |
| Conditions (1), (2) | ○ | ○ | ○ |
| Conditions (1'), (2') | ○ | ○ | ○ |
| Conditions (1"), (2") | ○ | ○ | ○ |
| Difference between object-to-image distances at 0.3× and 0.5× | 0.00000 | 0.00002 | 0.00000 |
| Smallest object-side F-number, MAXFNO | 3.5 | 3.5 | 3.5 |
| $|\Delta FNO/\Delta \beta|$ | 0.49 | 0.729 | 0.935 |
| Conditions (3), (4) | ○ | ○ | ○ |
| Conditions (3'), (4') | ○ | ○ | ○ |
| Conditions (3"), (4") | ○ | ○ | ○ |
| Lens arrangement of 1st lens unit; positive | ○ | ○ | ○ |
| Lens arrangement of 1st lens unit; positive, negative | ○ | ○ | ○ |
| Lens arrangement of 1st lens unit; positive, negative, positive | ○ | ○ | ○ |
| Virtual shape factor of 3rd lens unit $|(R3f + R3b)/(R3f - R3b)|$ | 2.27 | 2.69 | 2.32 |
| Condition (5) | ○ | ○ | ○ |
| Condition (5') | ○ | ○ | ○ |
| Condition (5") | ○ | ○ | ○ |
| 3rd lens unit: at least two meniscus lenses, each with a convex surface directed toward the object side | ○ | ○ | ○ |
| 3rd lens unit: at least three meniscus lenses, each with a convex surface directed toward the object side | ○ | ○ | ○ |

Note:
○ indicates that the condition is satisfied and x indicates that the condition is not satisfied.

TABLE 2

|  | Fourth embodiment | Fifth embodiment | Sixth embodiment |
|---|---|---|---|
| Object-side telecentricity $|En|/L$ ($\beta = 0.3$) | 2.59 | 3.06 | 0.34 |
| Object-side telecentricity $|En|/L$ ($\beta = 0.4$) | 11.97 | 58.72 | 0.48 |
| Object-side telecentricity $|En|/L$ ($\beta = 0.5$) | 2.68 | 2.61 | 0.80 |
| Image-side telecentricity $|En|/|L/\beta|$ ($\beta = 0.3$) | 0.25 | 0.26 | 1.47 |
| Image-side telecentricity $|En|/|L/\beta|$ ($\beta = 0.4$) | 0.33 | 0.35 | 1.96 |
| Image-side telecentricity $|En|/|L/\beta|$ ($\beta = 0.5$) | 0.41 | 0.43 | 2.46 |
| Conditions (1), (2) | ○ | ○ | ○ |
| Conditions (1'), (2') | x | x | ○ |
| Conditions (1"), (2") | x | x | x |
| Difference between object-to-image distances at 0.3× and 0.5× | 0.00000 | 0.00000 | 0.00000 |
| Smallest object-side F-number, MAXFNO | 3.45 | 3.5 | 3.5 |
| $|\Delta FNO/\Delta \beta|$ | 0.228 | 0.002 | 0.082 |
| Conditions (3), (4) | ○ | ○ | ○ |
| Conditions (3'), (4') | ○ | ○ | ○ |
| Conditions (3"), (4") | ○ | ○ | ○ |
| Lens arrangement of 1st lens unit; positive | ○ | ○ | ○ |
| Lens arrangement of 1st lens unit; positive, negative | ○ | ○ | ○ |
| Lens arrangement of 1st lens unit; positive, negative, positive | ○ | ○ | ○ |
| Virtual shape factor of 3rd lens unit $|(R3f + R3b)/(R3f - R3b)|$ | 2.34 | 2.29 | 2.494 |
| Condition (5) | ○ | ○ | ○ |
| Condition (5') | ○ | ○ | ○ |
| Condition (5") | ○ | ○ | ○ |
| 3rd lens unit: at least two meniscus lenses, each with a convex surface directed toward the object side | ○ | ○ | ○ |
| 3rd lens unit: at least three meniscus lenses, each with a convex surface directed toward the object side | ○ | ○ | ○ |

Note:
○ indicates that the condition is satisfied and x indicates that the condition is not satisfied.

TABLE 3

|  | Seventh embodiment | Eighth embodiment | Ninth embodiment |
|---|---|---|---|
| Object-side telecentricity $|En|/L$ ($\beta = 0.3$) | 2.60 | 0.16 | 0.26 |
| Object-side telecentricity $|En|/L$ ($\beta = 0.4$) | 36.46 | 0.37 | 0.41 |
| Object-side telecentricity $|En|/L$ ($\beta = 0.5$) | 2.56 | 0.80 | 0.75 |
| Image-side telecentricity $|En|/|L/\beta|$ ($\beta = 0.3$) | 0.23 | 0.19 | 0.27 |
| Image-side telecentricity $|En|/|L/\beta|$ ($\beta = 0.4$) | 0.76 | 4.15 | 2.53 |
| Image-side telecentricity $|En|/|L/\beta|$ ($\beta = 0.5$) | 13.92 | 0.56 | 0.74 |
| Conditions (1), (2) | ○ | ○ | ○ |
| Conditions (1'), (2') | ○ | x | x |
| Conditions (1"), (2") | ○ | x | x |
| Difference between object-to-image distances at 0.3x and 0.5x | 0.00000 | 0.00000 | 0.00000 |
| Smallest object-side F-number, MAXFNO | 3.51 | 3.5 | 3.5 |
| $|\Delta FNO/\Delta \beta|$ | 0.304 | 2.685 | 1.693 |

TABLE 3-continued

|  | Seventh embodiment | Eighth embodiment | Ninth embodiment |
|---|---|---|---|
| Conditions (3), (4) | o | o | o |
| Conditions (3'), (4') | o | o | o |
| Conditions (3"), (4") | o | x | x |
| Lens arrangement of 1st lens unit; positive | o | o | o |
| Lens arrangement of 1st lens unit; positive, negative | o | o | o |
| Lens arrangement of 1st lens unit; positive, negative, positive | o | o | o |
| Virtual shape factor of 3rd lens unit $|(R3f + R3b)/(R3f - R3b)|$ | 2.69 | 1.83 | 1.41 |
| Condition (5) | o | o | o |
| Condition (5') | o | o | o |
| Condition (5") | o | x | x |
| 3rd lens unit: at least two meniscus lenses, each with a convex surface directed toward the object side | o | o | o |
| 3rd lens unit: at least three meniscus lenses, each with a convex surface directed toward the object side | o | x | x |

Note: O indicates that the condition is satisfied and x indicates that the condition is not satisfied.

The imaging optical system of the present invention described above can be used in an optical apparatus such as a motion picture film scanner (a telecine apparatus) or a height measuring apparatus. Embodiments of such apparatuses are described below.

Figure 19:
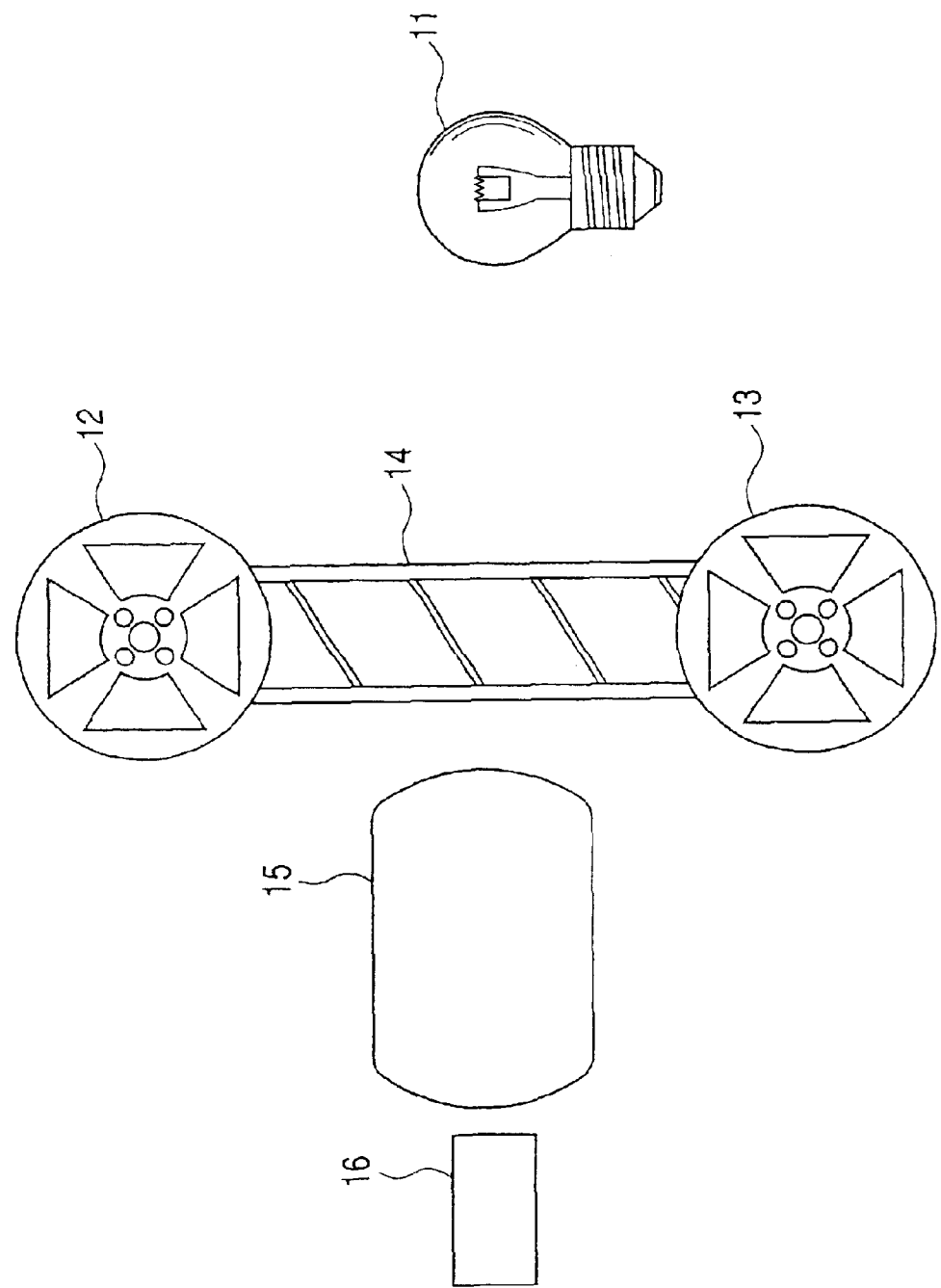
FIG. 19 is a conceptual view showing an embodiment of a telecine apparatus using the imaging optical system of the present invention.

FIG. 19 shows an embodiment of the telecine apparatus using the imaging optical system of the present invention. This telecine apparatus includes a light source 11 for projecting a motion picture, a motion picture film 14 wound on reels 12 and 13, an imaging optical system 15, such as that disclosed by each embodiment in the present invention, and a CCD camera 16. In the figure, the specific arrangement of the imaging optical system 15 is omitted.

In the telecine apparatus of this embodiment constructed as mentioned above, light emitted from the light source 11 is projected on the motion picture film 14, and projected light is imaged by the CCD camera 16 through the imaging optical system 15. In the imaging optical system 15, the magnification can be changed so that the image information of the motion picture film 14 is imaged over the entire imaging area of the CCD camera 16 in accordance with the size of the motion picture film 14.

According to the telecine apparatus of the embodiment, the imaging optical system 15 is both-side telecentric so that even when the imaging magnification is changed, the conjugate length remains unchanged. Therefore, there is no need to adjust the positions of individual members. Since the fluctuation of the image-side F-number is minimized and a loss of the amount of light is reduced, the adjustment of brightness is unnecessary. Moreover, a change in magnification on an image plane, caused by the disturbance of flatness of an object to be photographed, such as the film, can be kept to a minimum.

Figure 20:
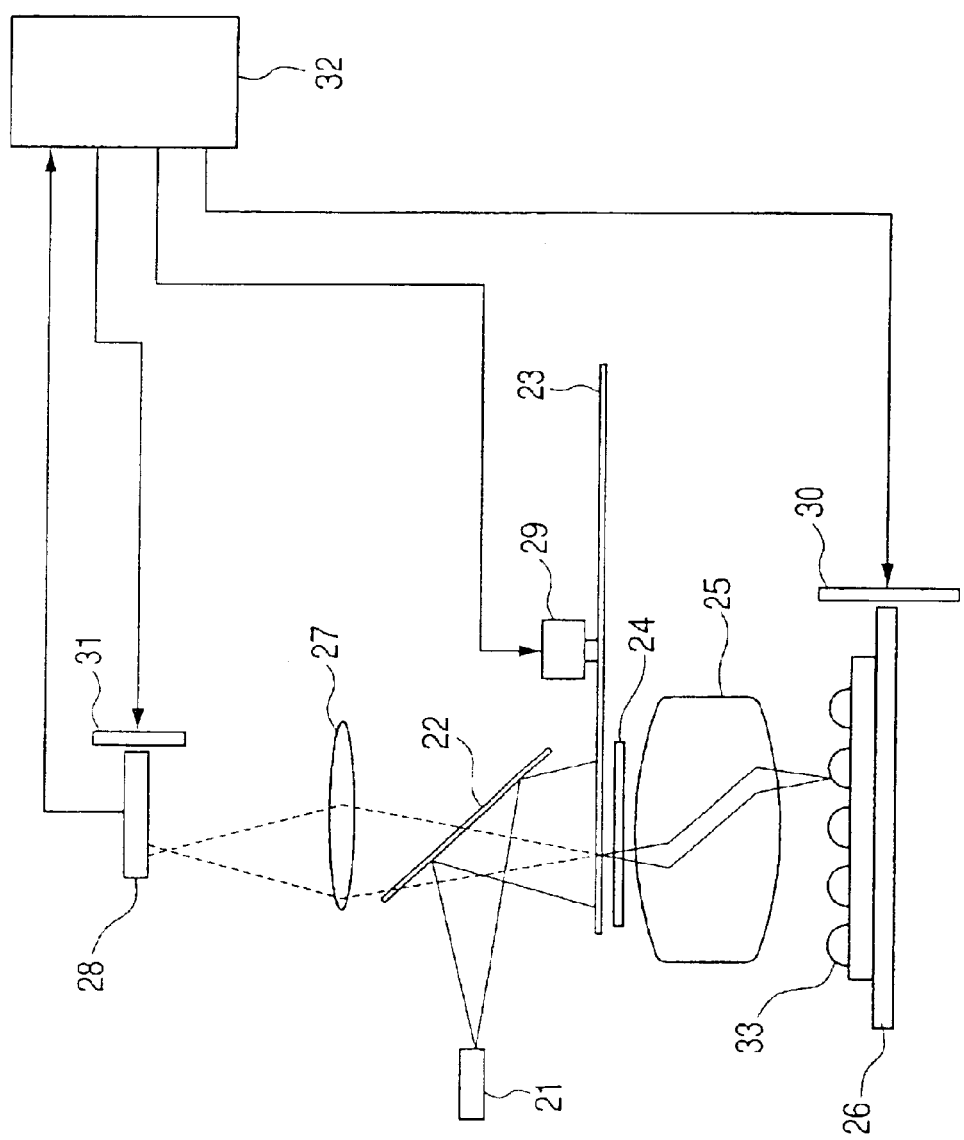
FIG. 20 is a view showing schematically an embodiment of a height measuring apparatus using the imaging optical system of the present invention.

FIG. 20 shows an embodiment of the height measuring apparatus using the imaging optical system of the present invention. In this embodiment, the imaging optical system is used as a confocal optical system.

The height measuring apparatus of the embodiment includes a light source 21, a polarization beam splitter 22, a disk 23 provided with a plurality of pinholes, a quarter-wave plate 24, a confocal optical system 25 constructed like the imaging optical system disclosed by each embodiment in the present invention, an XYZ stage 26, an imaging lens 27, an image sensor 28, a motor 29 driving the disk 23, a stage driving mechanism 30 driving the XYZ stage 26, a sensor driving mechanism 31 driving the image sensor 28, and a computer 32 controlling the drive of the motor 29, the stage driving mechanism 30, and the sensor driving mechanism 31.

In the height measuring apparatus of the embodiment constructed as mentioned above, a p or s component of linear polarization, of light emitted from the light source 21, is reflected by the polarization beam splitter 22, passes through the pinhole provided on the disk 23, and suffers a phase shift of 45° through the quarterwave plate 24 to irradiate a certain point of a specimen 33 placed on the XYZ stage 26 through the confocal optical system 25. Light reflected by the specimen 33 passes through the confocal optical system 25, suffers a phase shift of 45° through the quarter-wave plate 24, passes through the spot on the disk 23, is transmitted through the polarization beam splitter 22, and is imaged by the image sensor 28 through the imaging lens 27. By driving the motor 29 through the computer 32, the entire surface of the specimen 33 can be scanned. In this case, the position where the intensity of light of a confocal image of the specimen 33 imaged by the image sensor 28 becomes ultimate is found while shifting the driving mechanism 30 or 31 along the optical axis. Whereby, the height of the specimen is detected.

The magnification of the confocal optical system 25 can also be changed in accordance with the size of the specimen 33.

In this height measuring apparatus also, the confocal optical system 25 is both-side telecentric so that even when the magnification is changed, the conjugate length remains unchanged. Therefore, there is no need to adjust the positions of individual members. Since the fluctuation of the image-side F-number is minimized and a loss of the amount of light is reduced, the adjustment of brightness is unnecessary.

What is claimed is:

1. An imaging optical system including a variable magnification optical system, the variable magnification optical system comprising, in order from an object side toward an image side:

a first lens unit with positive refractive power;

a second lens unit with positive refractive power;

a third lens unit with negative refractive power;

a fourth lens unit with positive refractive power, and an aperture stop interposed between the third lens unit and the fourth lens unit, wherein the variable magnification optical system changes an imaging magnification while keeping a distance between an object and an image constant in the imaging optical system, the imaging magnification is changed by varying spacing between the first lens unit and the second lens unit, spacing between the second lens unit and the third lens unit, and spacing between the third lens unit and the fourth lens unit, and when the imaging magnification is changed, the imaging optical system satisfies the following conditions in at least one variable magnification state:

$|En|/L > 0.4$ $|Ex|/|L/\beta| > 0.4$ where En is a distance from a first lens surface on the object side of the variable magnification optical system to an entrance pupil of the imaging optical system, L is the distance between the object and the image in the imaging optical system, Ex is a distance from a most image-side lens surface of the variable magnification optical system to an exit pupil of the imaging optical system, and $\beta$ is a magnification of an entire system of the imaging optical system.

2. An imaging optical system according to claim 1, further satisfying the following conditions:

$$1.0 < MAXFNO < 8.0$$

$$|\Delta FNO/\Delta \beta| < 5$$

where MAXFNO is a smallest object-side F-number where the imaging magnification of the imaging optical system is changed, $\Delta FNO$ is a difference between the object-side F-number at a minimum magnification and the object-side F-number at a maximum magnification in the entire system of the imaging optical system, and $\Delta \beta$ is a difference between the minimum magnification and the maximum magnification in the entire system of the imaging optical system.

3. An imaging optical system according to claim 1, further satisfying the following condition:

$$0.6 < |(R3f+R3b)/(R3f-R3b)| < 5.0$$

where R3f is a radius of curvature of a most object-side surface of the third lens unit and R3b is a radius of curvature of a most image-side surface of the third lens unit.

4. An imaging optical system according to claim 1, wherein a most object-side lens of the first lens unit has positive refractive power.

5. An imaging optical system according to claim 1, wherein the first lens unit includes, in order from the object side, a lens with positive refractive power, a lens with negative refractive power, and a lens with positive refractive power.

6. An imaging optical system according to claim 1, wherein the third lens unit includes at least two meniscus lenses, each with a convex surface directed toward the object side.

7. An imaging optical system according to claim 1, wherein the third lens unit includes two meniscus lenses, each with negative refractive power, and one meniscus lens with positive refractive power.

8. An optical apparatus having an imaging optical system, the imaging optical system including a variable magnification optical system, the variable magnification optical system comprising, in order from an object side toward an image side:

a first lens unit with positive refractive power;

a second lens unit with positive refractive power;

a third lens unit with negative refractive power;

a fourth lens unit with positive refractive power, and an aperture stop interposed between the third lens unit and the fourth lens unit, wherein the variable magnification optical system changes an imaging magnification while keeping a distance between an object and an image constant in the imaging optical system, the imaging magnification is changed by varying spacing between the first lens unit and the second lens unit, spacing between the second lens unit and the third lens unit, and spacing between the third lens unit and the fourth lens unit, and when the imaging magnification is changed, the imaging optical system satisfies the following conditions in at least one variable magnification state:

$$|En|/L > 0.4$$

$$|Ex|/|L/\beta| > 0.4$$

where En is a distance from a first lens surface on the object side of the variable magnification optical system to an entrance pupil of the imaging optical system, L is the distance between the object and the image in the imaging optical system, Ex is a distance from a most image-side lens surface of the variable magnification optical system to an exit pupil of the imaging optical system, and $\beta$ is a magnification of an entire system of the imaging optical system.

* * * * *